(12) United States Patent
Cole et al.

(10) Patent No.: US 7,539,364 B2
(45) Date of Patent: May 26, 2009

(54) METHOD AND APPARATUS FACILITATING MECHANICAL BEAM STEERING FOR OPTICAL INTEGRATED CIRCUITS

(75) Inventors: Robert Cole, Mt. Hamilton, CA (US); Michael Guerrero, Morgan Hill, CA (US); Kenneth Purchase, Mountain View, CA (US); Anthony J. Ticknor, Cupertino, CA (US); Kenneth McGreer, Fremont, CA (US); David Menche, Redwood City, CA (US)

(73) Assignee: NeoPhotonics Corporation, San Jose, CA (US)

( * ) Notice: Subject to any disclaimer, the term of this patent is extended or adjusted under 35 U.S.C. 154(b) by 425 days.

(21) Appl. No.: 11/218,270

(22) Filed: Sep. 1, 2005

(65) Prior Publication Data

US 2006/0008198 A1   Jan. 12, 2006

Related U.S. Application Data

(62) Division of application No. 10/100,833, filed on Mar. 18, 2002, now Pat. No. 6,975,793.

(51) Int. Cl.
*G02B 6/12* (2006.01)
*G02B 6/32* (2006.01)

(52) U.S. Cl. .............................. 385/14; 385/24; 385/33; 385/52

(58) Field of Classification Search .................. 385/14, 385/15, 24, 33, 34, 52
See application file for complete search history.

(56) References Cited

U.S. PATENT DOCUMENTS

| | | | |
|---|---|---|---|
| 5,841,915 | A | 11/1998 | Rabinovich et al. |
| 5,841,920 | A | 11/1998 | Lemaire et al. |
| 5,914,972 | A | 6/1999 | Siala et al. |
| 5,991,483 | A | 11/1999 | Engelberth |
| 6,087,280 | A | 7/2000 | Beall et al. |
| 6,112,553 | A | 9/2000 | Poignant et al. |
| 6,118,909 | A | 9/2000 | Chen et al. |
| 6,137,939 | A | 10/2000 | Henry et al. |
| 6,169,838 | B1 | 1/2001 | He et al. |
| 6,201,918 | B1 | 3/2001 | Berkey et al. |
| 6,222,963 | B1 | 4/2001 | Grand et al. |
| 6,269,202 | B1 | 7/2001 | Lee et al. |
| 6,453,108 | B1 | 9/2002 | Sirkis |
| 6,490,395 | B1 * | 12/2002 | Nara et al. ..................... 385/39 |
| 6,603,892 | B1 | 8/2003 | Ticknor |
| 6,621,957 | B1 | 9/2003 | Sullivan et al. |
| 6,668,116 | B2 * | 12/2003 | Kashihara et al. ............. 385/37 |
| 6,671,439 | B2 | 12/2003 | Dieckroger |
| 6,738,545 | B1 | 5/2004 | Purchase et al. |
| 6,798,948 | B2 * | 9/2004 | Delisle et al. .................. 385/33 |

* cited by examiner

*Primary Examiner*—Sung H Pak
*Assistant Examiner*—Daniel Petkovsek
(74) *Attorney, Agent, or Firm*—Amin, Turocy & Calvin, LLP

(57) ABSTRACT

Actuators facilitating mechanical beam steering for optical integrated circuits are disclosed. The mechanical beam steering can mitigate thermal sensitivity of optical circuits, for example, arrayed waveguides. Also disclosed are methods for fabricating optical integrated circuits employing actuators.

23 Claims, 20 Drawing Sheets

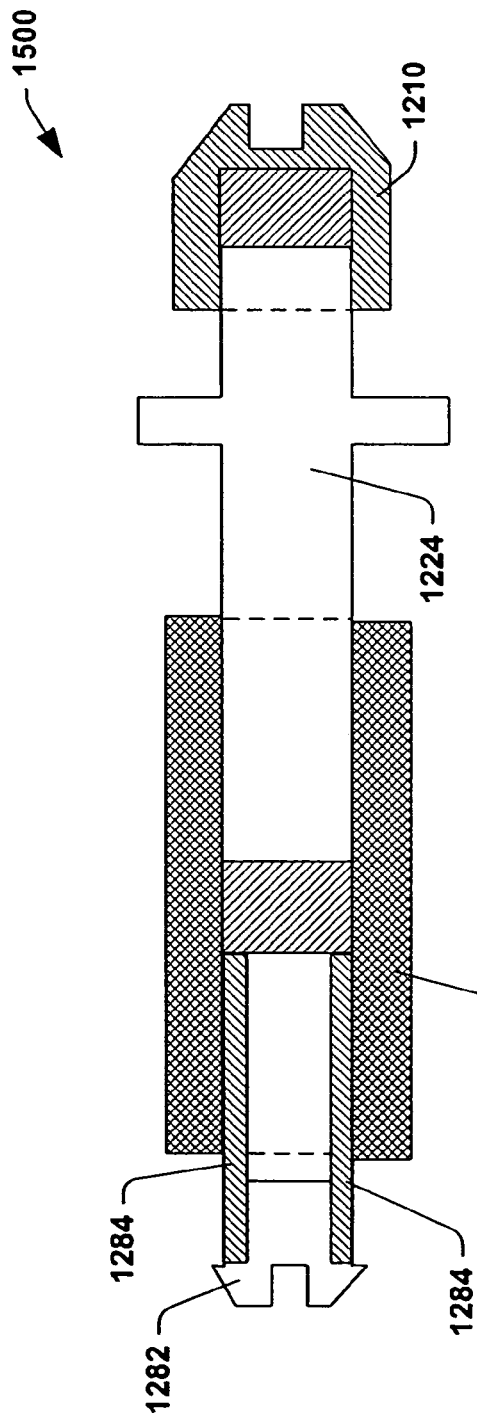
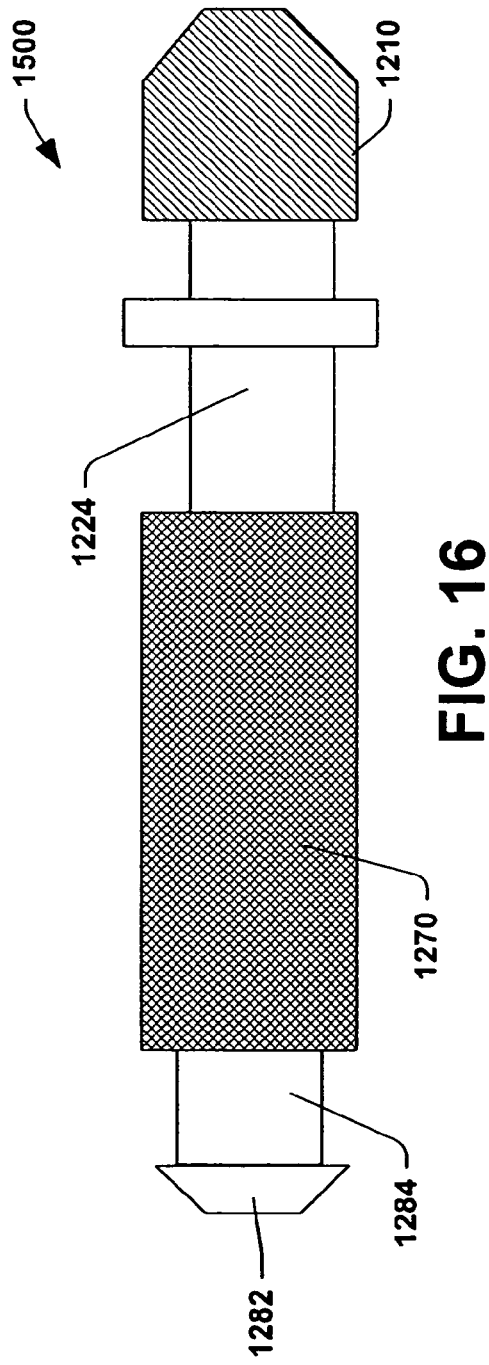

METHOD AND APPARATUS FACILITATING MECHANICAL BEAM STEERING FOR OPTICAL INTEGRATED CIRCUITS

This application is a divisional of U.S. application Ser. No. 10/100,833, entitled Method and Apparatus Facilitating Mechanical Beam Steering for Optical Integrated Circuits and filed on Mar. 18, 2002, now U.S. Pat. No. 6,975,793 the entirety of which is incorporated herein by reference.

TECHNICAL FIELD

The present invention relates to the art of optical integrated circuits and more particularly to apparatus and methods for mechanical beam steering for optical integrated circuits.

BACKGROUND OF THE INVENTION

Optical integrated circuits (OICs) come in many forms such as 1xN optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate using lithographic processing, wherein the waveguides are made from transmissive media, which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. For example, early systems provided four different wavelengths separated by 400 GHz, wherein each wavelength transferred data at 2.5 Gbits per second. Current multiplexed optical systems employ as many as 160 wavelengths on each optical fiber.

In order to provide advanced multiplexing and demultiplexing (e.g., DWDM) and other functions in such networks, arrayed-waveguide gratings (AWGs) have been developed in the form of PLCs. Existing AWGs can provide multiplexing or demultiplexing of up to 80 channels or wavelengths spaced as close as 50 GHz. As illustrated in FIG. 1, a conventional demultiplexing AWG 2 includes a base 4, such as a silicon substrate, with a single input port 6, and multiple output ports 8. Multiple wavelength light is received at the input port 6 (e.g., from an optical fiber in a network, not shown) and provided to an input lens 10 via an input optical path or waveguide 12 on the substrate base 4.

The input lens 10 spreads the multiple wavelength light into an array of waveguides 14, sometimes referred to as arrayed-waveguide grating arms. Each of the waveguides or arms 14 has a different optical path length from the input lens 10 to an output lens 16, resulting in a different phase tilt at the input to the lens 16 depending on wavelength. This phase tilt, in turn, affects how the light recombines in the output lens 16 through constructive interference. The lens 16 thus provides different wavelengths at the output ports 8 via individual output waveguides 18, whereby the AWG 2 can be employed in demultiplexing light signals entering the input port 6 into two or more demultiplexed signals at the output port 8. The AWG 2 can alternatively be used to multiplex light signals from the ports 8 into a multiplexed signal having two or more wavelength components at the port 6.

A problem with optical integrated circuits, such as the conventional AWG 2 of FIG. 1 is temperature sensitivity. Since the waveguide material usually has a temperature dependent refractive index, the channel wavelengths of multi/demultiplexer shift as the temperature varies. This shift is typically of the order of 0.01 nm/° C. in silica-based devices and 0.1 nm/° C. in InP based devices. This wavelength shift can result in a loss of signal and/or cross talk in communication system(s) employing the AWG 2. As communication system(s) are designed with increasingly smaller channel spacing, even a small temperature dependent wavelength shift can have a significant effect on system performance. Presently, most AWG's must have active stabilization of the device operating temperature in order to perform acceptably. This stabilization is typically achieved by the addition of resistive heaters, temperature sensors, active electronics, and in some cases also thermoelectric coolers. Even though an AWG is a passive filter, currently it requires significant electronics and a few watts of power to operate effectively.

Accordingly, there remains a need for better solutions to temperature sensitivity in optical integrated circuits such as AWGs, which avoid or mitigate the performance reductions associated with conventional optical integrated circuits and provide for mitigation of active temperature stabilization and its associated costs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides optical integrated circuit apparatuses and methods for mechanical beam steering mitigating and/or overcoming the shortcomings associated with conventional optical integrated circuit(s) and other devices. The invention further comprises methods for fabricating OICs and for mitigating temperature sensitivity utilizing actuators for mechanical beam steering in OICs.

According to an aspect of the present invention, actuators are provided having a first actuator body part with a first coefficient of thermal expansion coupled to a second actuator body part with a second coefficient of thermal expansion.

Another aspect of the present invention provides for actuators to be employed with OICs. The OICs include a first region having a waveguide, a second region having a waveguide and a connecting region coupled to the first region and the second region. The connecting region can comprise a first lens that optically couples the waveguide of the first region to the waveguide of the second region. The actuator is located adjacent to the first region, for example, to facilitate mechanical beam steering.

Another aspect of the invention provides a methodology for fabricating an optical integrated circuit. The method comprises providing a base, forming at least one waveguide in a first region, forming at least one waveguide in a second region and forming a connecting region comprising a first lens coupling the at least one waveguide of the first region to the at least one waveguide of the second region. The first region and the second region are then scroll-diced from each other such that remaining mechanical continuity is generally provided through the connecting region. Thereafter, an actuator is placed in between the first region and the second region.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 15 is a cross section view an actuator in accordance with an aspect of the present invention;

FIG. 16 is a schematic top plan view of the actuator of FIG. 15;

DETAILED DESCRIPTION OF THE INVENTION

Figure 1:
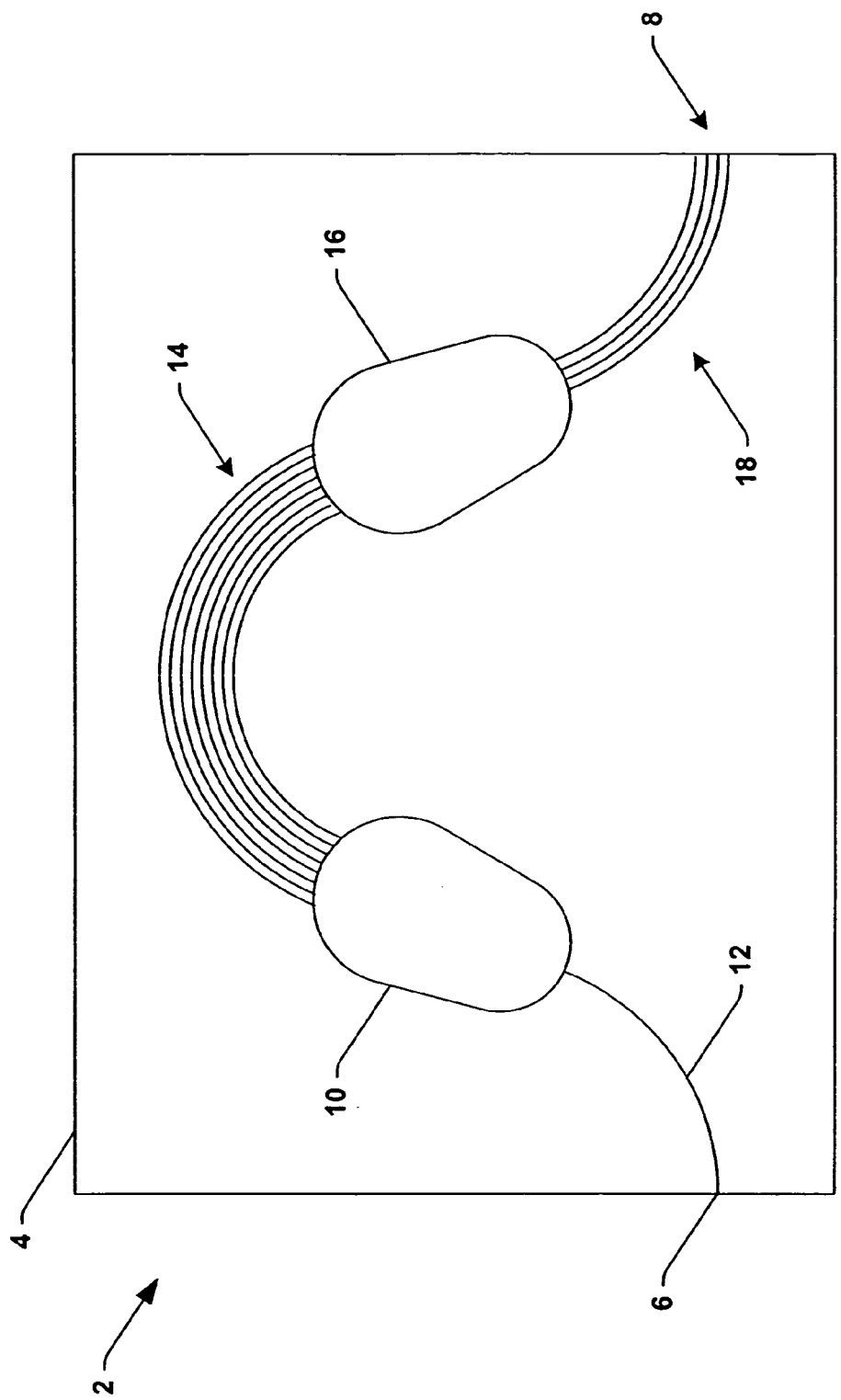
FIG. 1 is a schematic top plan view of a conventional arrayed-waveguide grating (AWG) multiplexer/demultiplexer device.

The various aspects of the present invention will now be described with reference to the drawings, wherein like reference numerals are used to refer to like elements throughout. The invention provides for mitigation of temperature sensitivity of optical integrated circuits by employing mechanical beam steering.

In one embodiment, the actuator of the present invention is employed in any of the optical integrated circuits described in U.S. Pat. No. 6,738,545 filed Mar. 18, 2002 entitled "Athermal AWG and AWG with Low Power Consumption Using Groove of Changeable Width" which incorporated herein by reference. In yet another embodiment, an actuator or block is described in co-pending U.S. Pat. No. 6,603,892 filed Oct. 24, 2001 entitled "Mechanical Beam Steering for Optical Integrated Circuits" along with related concepts, which incorporated herein by reference.

Figure 2:
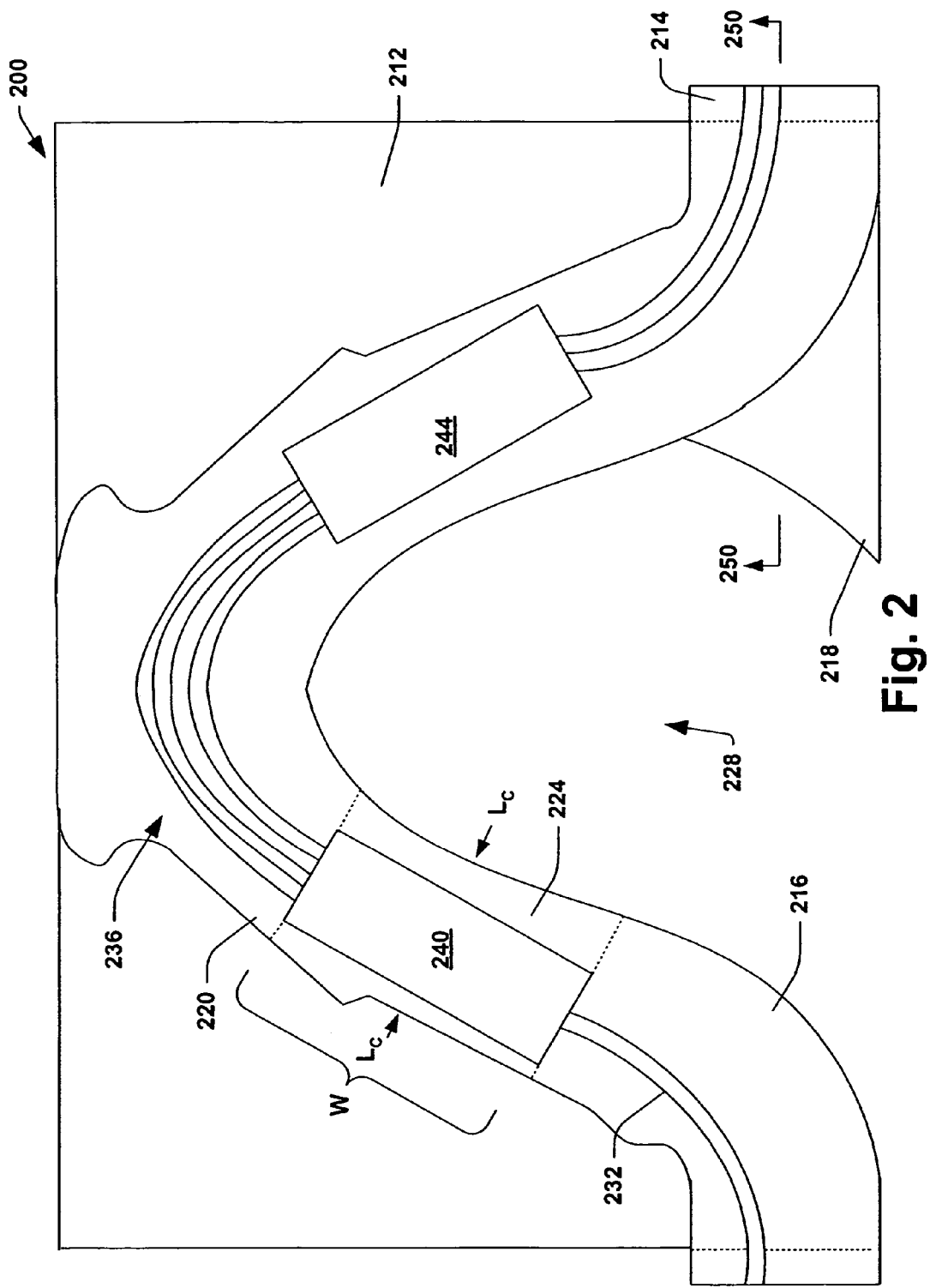
FIG. 2 is a schematic top plan view of an exemplary optical integrated circuit.
Figure 3:
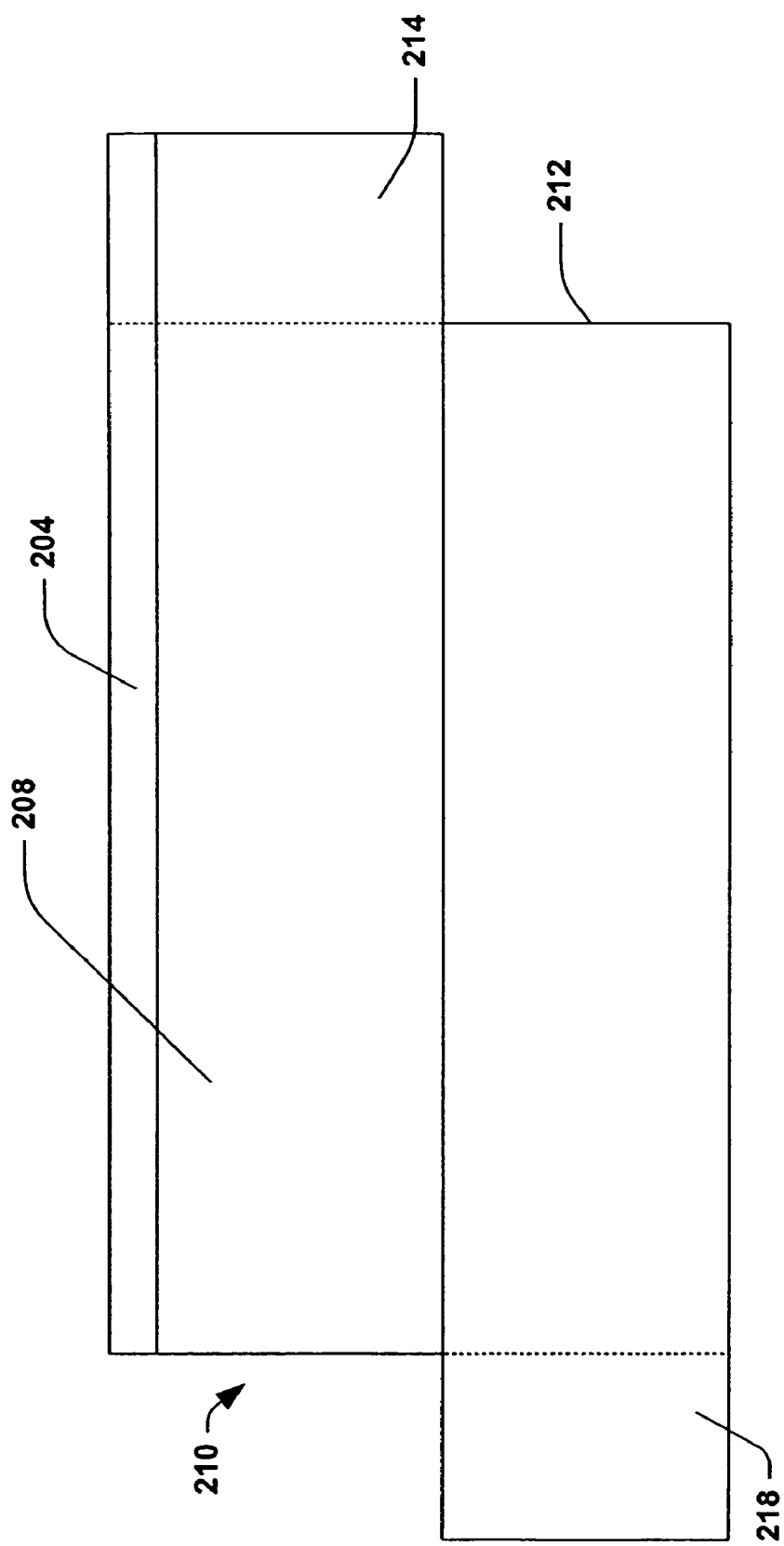
FIG. 3 is a cross section view of the exemplary optical integrated circuit of FIG. 2.

Referring to FIGS. 2 and 3, an exemplary optical integrated circuit (OIC) 200 is illustrated. The OIC 200 includes one or more optical layers 204, for example, deposited on a substrate 208. The optical layers 204 and the substrate 208 can be collectively referred to as the chip 210.

The optical layers 204 can be coextensive (e.g., have substantially the same spatial boundaries) with the substrate 208. The optical layers 204 are capable of transmitting light in a controlled manner. The optical layers 204 can comprise layer(s) of silica and the substrate 208 can comprise a portion of a silicon wafer.

The OIC 200 can further include a chip carrier 212. The chip carrier 212 can be coextensive with the chip 210 in particular region(s) and/or not coextensive in other region(s). For example, in a chip extensive region 214, the chip 210 physically extends beyond the chip carrier 212. In a carrier extensive region 218, the chip carrier 212 physically extends beyond the chip 210. The chip extensive region 214 can be used, for example, to facilitate attachment of optical fiber(s) to the chip 210.

The optical layers 204 include a first region 216, a second region 220 and a connecting region 224. For example, scroll-dicing (e.g. using a water-jet, laser-wafer-cutter and/or wire-saw) may be employed to mechanically isolate the first region 216 and the second region 220 leaving a monolithic connection through the connecting region 224 and forming a gap 228 generally between the first region 216 and the second region 220.

In one example, the chip carrier 212 is coextensive with the optical layers 204 in the area of the gap 228. In another example, the chip carrier 212 is not coextensive with the optical layers 204 in the area of the gap 228. In yet a third example, the chip carrier 212 is coextensive with the optical layers 204 in some portions of the gap 228 and not coextensive with the optical layers 204 in other portions of the gap 228.

The first region 216 can include first region waveguide(s) 232 (e.g., optical waveguide(s) and/or slab waveguide(s)). The second region 220 can include second region waveguide(s) 236 (e.g., optical waveguide(s) and/or slab waveguide(s)). The connecting region 224 can comprise a first lens 240. The first lens 240 can spread light from the first region waveguide(s) 232 to the second region waveguide(s) 236. Alternatively, the first lens 240 can focus light from the second region waveguide(s) 236 to the first region waveguide(s) 232. Optionally, the OIC 200 can include a second lens 244.

Referring briefly to FIG. 3, a cross sectional view taken along the line 250-250 of the OIC of FIG. 2 is illustrated.

Figure 4:
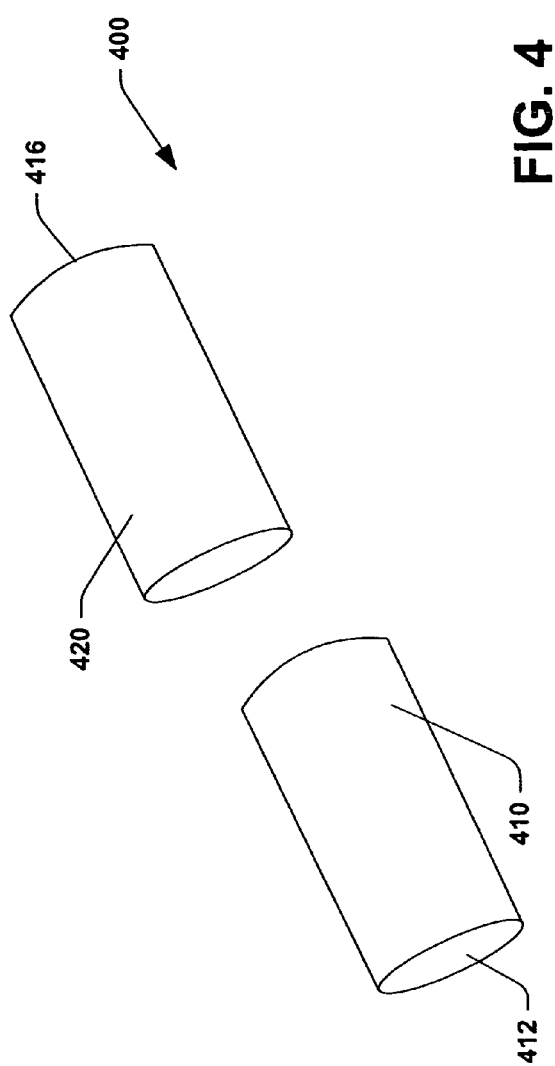
FIG. 4 is a perspective view of an exemplary actuator in accordance with an aspect of the present invention.

Turning next to FIG. 4, an exemplary actuator 400 in accordance with an aspect of the present invention is illustrated. The actuator 400 includes a first actuator body part 410 and a second actuator body part 420.

The actuator 400 expands and/or contracts with temperature changes. In one embodiment, it is desirable to have the expansion and/or contraction of the actuator 400 to be substantially linear with temperature over a range of temperatures that is specified as the "operating temperature range" (change of length in the actuator 400 has a substantially linear relationship with change in temperature). In another embodiment, the actuator 400 applies a force over the operating temperature range of an OIC.

In accordance with an aspect of the present invention, the actuator 400 can be employed as a component of an OIC to facilitate mechanical beam steering mitigating and/or overcoming the shortcomings associated with conventional optical integrated circuit(s) and other devices. For example, the actuator 400 can be employed in an OIC in order to mitigate temperature sensitivity of the OIC. The actuator 400 has a first end 412 and a second end 416. Although AWG chips containing an waveguide grating are discussed at length, the OIC may contain a Mach-Zehnder interferometer.

The first actuator body part 410 and/or the second actuator body part 408 can be made of one or more of a metal such as aluminum, brass, bronze, chromium, copper, gold, iron, magnesium, nickel, palladium, platinum, silver, stainless steel, tin, titanium, tungsten, zinc, zirconium, Hastelloy®, Kovar®, Invar, Monel®, Inconel®, a ceramic material such as alumina or aluminum silicate, a polymeric material such as silicone rubber or an elastomer, a polyamide composite such as Zytel® or fiberglass reinforced nylon, polycarbonate, polyolefin, polyester, cross-linked polymer such as silicone rubber, PEEK, a polymer composite material (e.g., carbon fiber, graphite and/or glass fiber), a liquid crystal polymer and the like.

The first actuator body part 410 has a first coefficient of thermal expansion. Similarly, the second actuator body part 408 has a second coefficient of thermal expansion. In one example, the first coefficient of thermal expansion is substantially similar to the second coefficient of thermal expansion. In another example, the first coefficient of thermal expansion is greater than the second coefficient of thermal expansion. In yet a third example, the first coefficient of thermal expansion is less than the second coefficient of thermal expansion.

When employed as part of an OIC 200, the force that is applied by the actuator 400 can be in a direction that tends to widen the gap 228, in which case the actuator 400 is in a state of compression and is referred to herein as a "compressive-state actuator". Alternatively, the force that is applied can be in a direction that tends to narrow the gap 228, in which case the actuator 400 is in a state of tension and is referred to herein as a "tensile-state" actuator. For an actuator 400 that is in a state of compression, the actuator maintains a force (e.g., between 210 and 220) at its minimum temperature of operation if its length is large enough so that it does not lose contact (e.g., with either the first region 216 or a second region of contact) at its minimum temperature of operation. It should also maintain contact (e.g., with both regions) at the minimum specified storage temperature of the device. Because the length of the actuator 400 can have a narrow tolerance and the width of the gap 228 can be subject to fabrication variance(s), it can be advantageous for the actuator 400 to have an adjustable length, $L_A$, so that it can be adjusted to meet requirements of a particular AWG (e.g., after the gap 228 has been cut into the AWG).

Furthermore, the actuator length, $L_A$, can be adjusted to provide the passband of a particular channel of the AWG with the desired center-wavelength (CW). This adjustment can be used to correct for fabrication variation(s) in the optical properties of the materials that can lead to a slight discrepancy between the desired CW (e.g., as designed) and the CW as manufactured. A third advantage of having an adjustable length is that the installation process can be simplified. Installing the actuator 400 while it has its final desired length can be difficult because at that length it will be exerting a force (e.g., between regions). Thus, it may be preferable to temporarily make the actuator 400 shorter than the desired final length while it is inserted into the gap 228 and subsequently lengthened to the desired final length such that the force (e.g., between regions) takes effect only as the actuator 400 is lengthened. In addition, for a particular OIC geometry (e.g., cut-out), it can be difficult to calculate a priori the value of the CTE of the actuator 400 that is required to provide the degree of beam steering that cancels the effect that the change of temperature has on the refractive index of the materials. For this reason, it can be useful for the actuator 400 to have a value of CTE that can be adjusted between the maximum and minimum estimates of the required values.

The first actuator body part 410 is coupled to the second actuator body part 420. For example, the first actuator body part 410 can be coupled to the second actuator body part 420 by welding, crimping, gluing, fusing and/or other suitable manner of coupling.

While the first actuator body part 410 and the second actuator body part 420 are depicted as cylindrical in FIG. 4, it is to be appreciated that any suitable shape for the first actuator body part 410 and/or the second actuator body part 420 can be employed in accordance with the present invention.

Figure 4A:
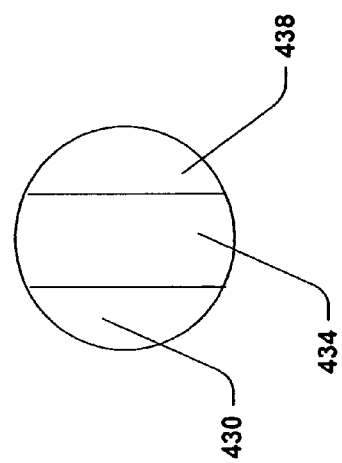
FIG. 4A is a cross-section view of a component of an actuator in accordance with an aspect of the present invention.

Referring briefly to FIG. 4A, in one embodiment, the second actuator body part 420 comprises three component parts 430, 434, 438. The three component parts 430, 434, 438 can comprise suitable materials with similar or different coefficients of thermal expansion.

In one example, one component part 430 and another component part 438 comprise a first material having a first coefficient of thermal expansion and the second component part 434 comprises a second material having a second coefficient of thermal expansion. The component parts 430, 434, 438 can be coupled (e.g., spot-welded) at appropriate location(s) to effect an appropriate overall coefficient of thermal expansion of the second actuator body part 420 and/or the actuator 400.

Figure 5:
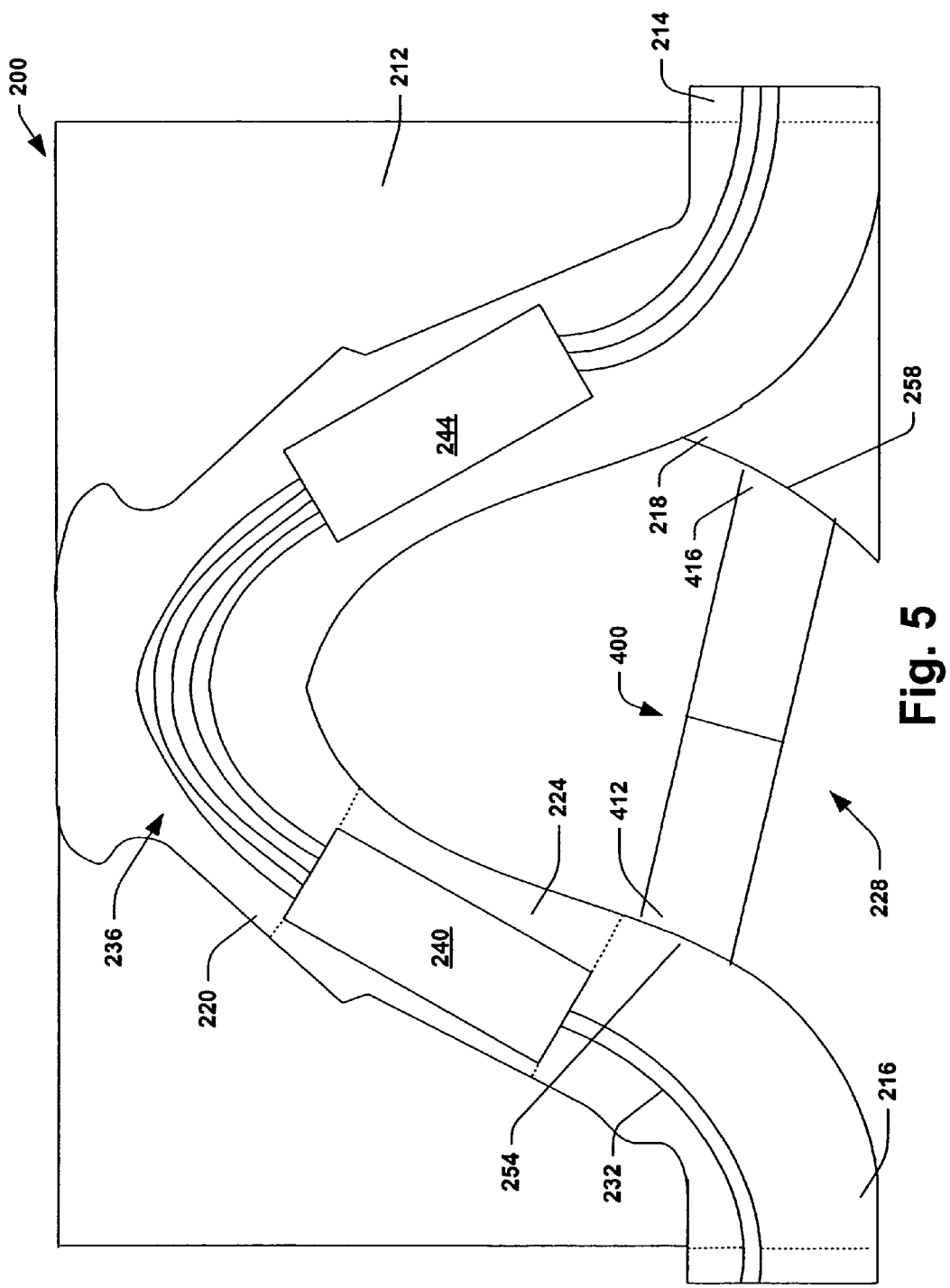
FIG. 5 is schematic top plan view of the OIC of FIG. 2 employing the actuator of FIG. 4 in accordance with an aspect of the present invention.

Referring next to FIG. 5, the OIC of FIG. 2 employing the actuator 400 in accordance with an aspect of the present invention is illustrated. For example, the actuator 400 can be included generally within the gap 228.

The actuator 400 expands and/or contracts with temperature changes causing the first region 216 and/or at least a portion of the connecting region 224 to move with respect to the second region 220. The actuator 400 can be held in place (e.g., kinematically and/or with an adhesive).

Carrier extensive region(s) can be designed to facilitate installation of the actuator 400. In one example, the chip carrier 212 can be configured with a first contact region 254 which comprises a portion of the first region 210 and a portion of the chip carrier 212. In this example, at about first contact region 254, a portion of the first region 210 and a portion of the chip carrier 212 can make physical contact with the actuator 400. In another example, the chip carrier 212 can be configured with a second contact region 258 which can be chip extensive. The first end 412 can make contact with the first contact region 254 and the second end 416 can make contact with the second contact region 258.

In one embodiment, the actuator 400 causes the first region 216 to move about 0.5 micron or more and about 100 microns or less respect to the second region 220 in response to temperature changes within the normal operating range of the device (e.g., in the range of about −20° C. to about +95° C.). In another embodiment, the actuator 400 causes the first region 216 to move about 5 microns or more and about 50 microns or less with respect to the second region 220. In a third embodiment, the actuator 400 causes the first region 216 to move about 10 microns or more and about 25 microns or less with respect to the second region 220.

In a fourth embodiment, the actuator 400 changes length by about 0.01 micron or more and about 10 microns or less per ° C. temperature change. In a fifth embodiment, the actuator 400 changes length by about 0.1 micron or more and about 5 microns or less per ° C. temperature change. In a sixth embodiment, the actuator 400 changes length by about 0.2 micron or more and about 2 microns or less per ° C. temperature change.

In one example, the connecting region 224 deforms sufficiently to accommodate the rotation of the first region 216 relative to the second region 220. It is to be appreciated that the first region 216 and/or the second region 220 may also deform to some extent; however, in this example, it is preferable for the relative rotation to be primarily accommodated by the deformation in the connecting region 224 (e.g., it is preferable for the connecting region 224 to deform to a larger extent than the first region 216 or the second region 220). To facilitate deformation of the connecting region 224, the connecting region 224 can be designed and/or manufactured to be as narrow as possible without obstructing the propagation of light through it and for the first region 216 and the second region to be substantially wider than the connecting region 224.

Referring briefly to FIG. 2, in one example, a cross section of the connecting region 224 has a lateral dimension, $L_C$, that is generally less than the nominal width of the connecting region 224, W. Accordingly, flexing due to external force, such as from an actuator as further described below, is permitted. In one embodiment, the lateral dimension $L_C$ of the cross section of the connecting region 224 is about 10 micron or more and about 10000 microns or less. In another embodiment, the lateral dimension $L_C$ of the cross section of the connecting region 224 is about 100 microns or more and about 5000 microns or less. In yet a third embodiment, the lateral dimension $L_C$ of the cross section of the connecting region 224 is about 500 microns or more and about 2000 microns or less.

Furthermore, it is to be appreciated that the first region 216, the connecting region 224 and the second region 220 can have any suitable geometry.

For example, multiple wavelength light can be received at an input port (not shown) (e.g., from an optical fiber in a network) and transported via the first region waveguide(s) 232 and provided to the first lens 240. The first lens 240 can process (e.g., spread) the multiple wavelength light into the second region waveguide(s) 226 (e.g., arrayed waveguide grating arms). The second region waveguide(s) 236 can then provide the multiple wavelength light to output port(s) (not shown).

As the temperature of the OIC 200 increases, the index of refraction of the first region waveguide(s) 232 and/or the index of refraction of the second region waveguide(s) 236 may change. In order to compensate for this temperature based index of refraction change, the actuator 200 expands as a result of the temperature change, causing the first region 216 and/or at least a portion of the connecting region 224 to move (e.g., rotate) with respect to the second region 220. Similarly, as the temperature of the OIC 200 decreases, the actuator 400 contracts causing the first region 216 and/or at least a portion of the connecting region 224 to move (e.g., rotate) with respect to the second region 220. It is believed that the movement (rotation) caused by temperature changes corresponds to or compensates for the temperature-change induced wavelength shifts in the first region and/or second region waveguide(s) 232, 236 due to temperature dependant refractive index. As such, wavelength shift associated with waveguide temperature dependent refractive index change can be mitigated. Thus, loss of signal and/or cross talk in communication system(s) employing the OIC 200 can be reduced.

Figure 6:
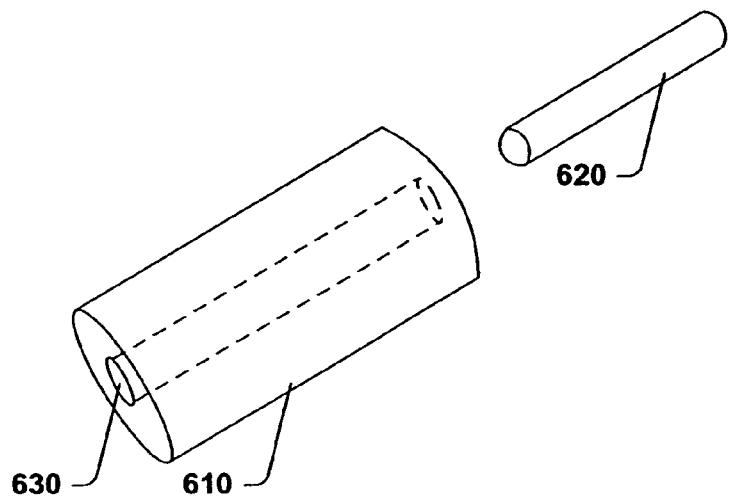
FIG. 6 is a perspective view of an actuator in accordance with an aspect of the present invention.

Turning next to FIG. 6, an embodiment of an actuator 600 in accordance with an aspect of the present invention is illustrated. The actuator 600 includes a first actuator body part 610 and a second actuator body part 620.

The first actuator body part 610 includes a boring 630 through at least part of the first actuator body part 610. The first actuator body part 610 has a first coefficient of thermal expansion. The second actuator body part 620 has a second coefficient of thermal expansion.

In this embodiment, the second actuator body part 620 is inserted into at least a portion of the boring 630 of the first actuator body part 610 to facilitate coupling of the first actuator body part 610 and the second actuator body part 620. Once a desired amount of the second actuator body part 620 has been inserted into the boring 630, the first actuator body part 610 and the second actuator body part 620 can be coupled together by any suitable means, for example, by welding, crimpling, gluing and/or fusing.

Further, operating characteristics (e.g., overall tension and/or compression) of the actuator 600 can be based, at least in part, upon the amount of the second actuator body party 620 inserted into the boring 630. For example, if the first coefficient of thermal expansion is different than the second coefficient of thermal expansion, the overall thermal characteristics of the actuator 600 is based, at least in part, upon the amount of second actuator body part 620 inserted into the boring 630.

In one example, the first actuator body part 610 comprises an aluminum tube and the second actuator body part 620 comprises a steel rod. The first actuator body party 610 (steel rod) is inserted inside the second actuator body part 620 (aluminum tube) and the length of the second actuator body part 620 (aluminum tube) is adjusted by pulling an end of the actuator 600 until it is a desired length. The second actuator body part 620 (aluminum tube) is then crimped at a desired location to facilitate coupling of the first body part 610 to the second actuator body part 620.

Figure 7:
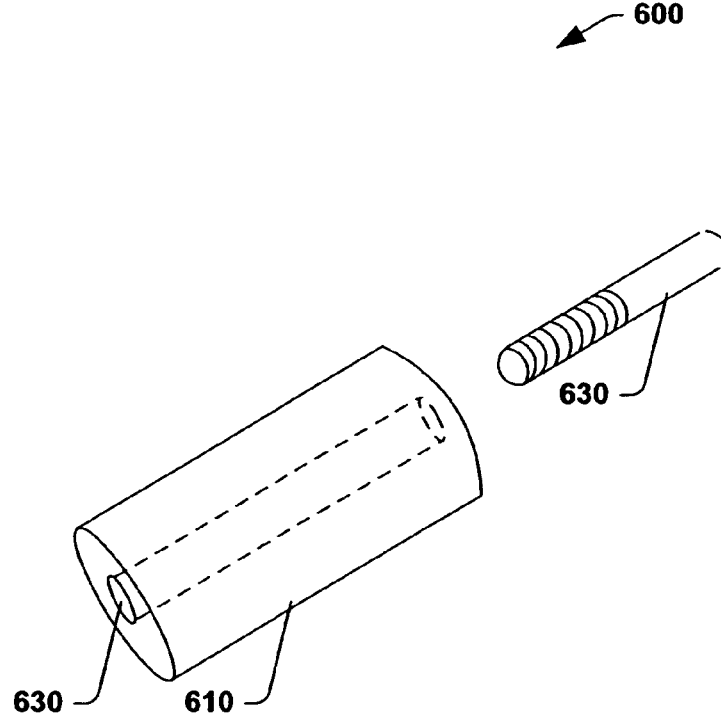
FIG. 7 is a perspective view of an actuator in accordance with an aspect of the present invention.

Referring briefly to FIG. 7, another embodiment of the actuator 600 depicted in FIG. 6 is illustrated. In this embodiment, at least a portion of the boring 630 of the first body part 610 is provided to receive a threaded insert. Similarly, at least a portion of the second actuator body part 620 is provided with a thread. The second actuator body part 620 can be threadably inserted into the boring 630 of the first body part 610 to facilitate coupling of the first actuator body part 610 and the second actuator body part 620.

While the first actuator body part 610 and the second actuator body part 620 are depicted as cylindrical in FIG. 6, it is to be appreciated that any suitable shape for the first actuator body part 610 and/or the second actuator body part 620 can be employed in accordance with the present invention.

Figure 8:
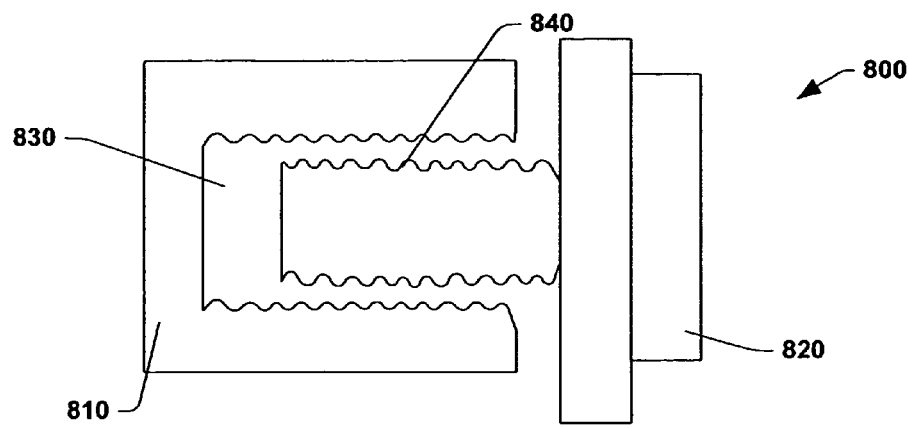
FIG. 8 is a schematic top plan view of an actuator in accordance with an aspect of the present invention.

Turning next to FIG. 8, an embodiment of an actuator 800 in accordance with an aspect of the present invention is illustrated. The actuator 800 includes a first actuator body part 810 and a second actuator body part 820. FIG. 8 illustrates an embodiment of a compressive-state actuator in which the length of the actuator 800 can be adjusted.

The first actuator body part 810 includes a boring 830 through at least part of the first actuator body part 810. The first actuator body part 810 has a first coefficient of thermal expansion.

The second actuator body part 820 includes a threaded portion 840. The second actuator body part 820 has a second coefficient of thermal expansion.

In this embodiment, the threaded portion 840 of the second actuator body part 820 is inserted into at least a portion of the boring 830 of the first actuator body part 810 to facilitate coupling of the first actuator body part 810 and the second actuator body part 820. In one example, once a desired amount of the second actuator body part 820 has been inserted into the boring 830, the first actuator body part 810 and the second actuator body part 820 can be coupled. Operating characteristics (e.g., overall tension and/or compression) of the actuator 800 can be based, at least in part, upon the amount of the threaded portion 840 of the second actuator body party 820 inserted into the boring 830. For example, if the first coefficient of thermal expansion is different than the second coefficient of thermal expansion, the overall thermal characteristics of the actuator 800 is based, at least in part, upon the amount of threaded portion 840 of the second actuator body part 820 inserted into the boring 830.

Figure 9:
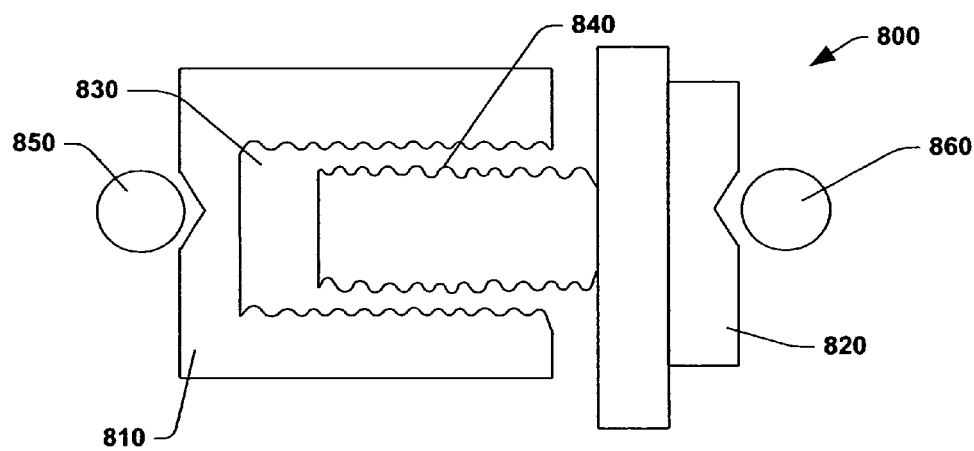
FIG. 9 is a schematic top plan view of an actuator in accordance with an aspect of the present invention.

Referring briefly to FIG. 9, another embodiment of the actuator 800 depicted in FIG. 8 is illustrated. In this embodiment, the first actuator body part 810 is adapted to receive a first contact piece 850. The second actuator body part 820 can similarly be adapted to receive a second contact piece 860.

The first contact piece 850 and/or the second contact piece 860 can comprise, for example, a hard metal (e.g., stainless steel) sphere or, alternatively, a hard metal cylinder. It is to be appreciated that the first contact piece 850 and/or the second contact piece 860 can comprise any suitable material and/or geometry.

The first contact piece 850 and/or the second contact piece 860 can be detachable from the remainder of the actuator 800 (e.g., not permanently coupled to the first actuator body part 810 and/or the second actuator body part 820).

Figure 10:
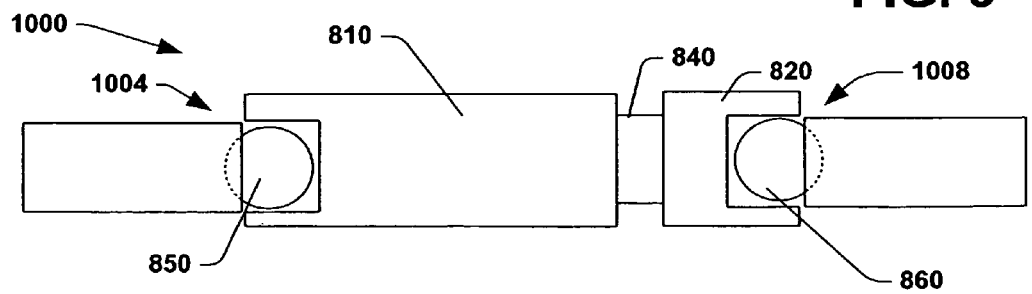
FIG. 10 is a cross section view of an OIC employing the actuator of FIG. 9 in accordance with an aspect of the present invention.

Turning briefly to FIG. 10, a cross section view of an OIC 1000 having a first contact region 1004 and a second contact region 1008 is illustrated. The OIC 1000 further employs an actuator 800, a first contact piece 850 and a second contact piece 860.

Figure 11:
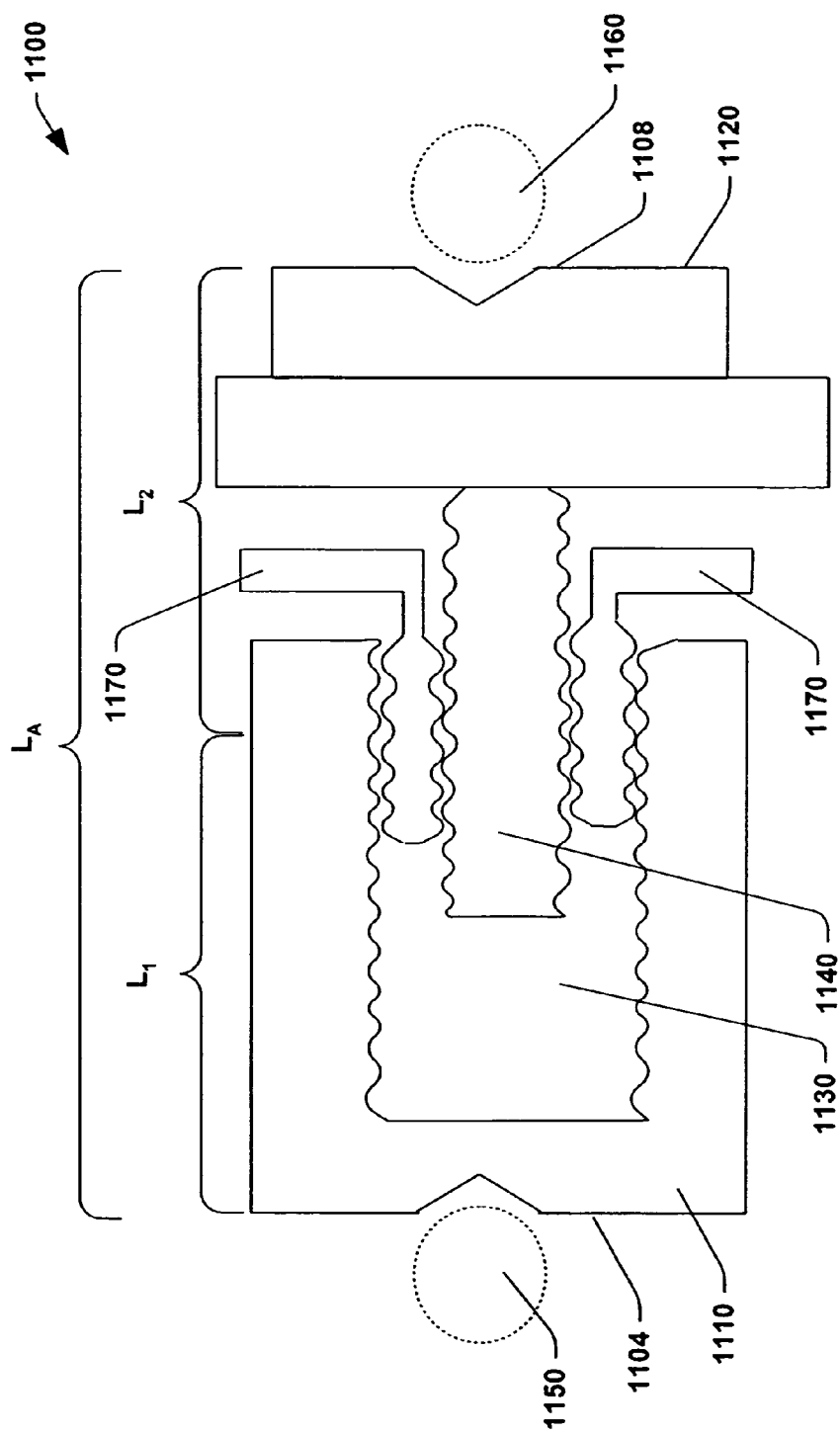
FIG. 11 is a schematic top plan view of an actuator in accordance with an aspect of the present invention.

Referring next to FIG. 11, an actuator 1100 in accordance with an aspect of the present invention is illustrated. The actuator 1100 is one embodiment of a compressive-state actuator having both its length, $L_A$, and its coefficient of thermal expansion (CTE) independently adjustable. The actuator 1100 has a first end 1104 and a second end 1108.

In this embodiment, the actuator 1100 includes a first actuator body part 1110 and a second actuator body party 1120. The first actuator body part 1110 includes a boring 1130 through at least part of the first actuator body part 1110. The first actuator body part 1110 has a first coefficient of thermal expansion ($CTE_1$).

The second actuator body part 1120 includes a threaded portion 1140. The second actuator body part 1120 has a second coefficient of thermal expansion ($CTE_2$).

The actuator 1100 further comprises a ring 1170 that has a third coefficient of thermal expansion ($CTE_3$). The ring 1170 can comprise any suitable material, for example copper.

The ring 1170 can be threadably coupled to the threaded portion 1140 of the second actuator body part 1120. The threaded portion 1140 of the second actuator body part 1120 and the ring 1170 can then be threadably coupled to the first actuator body part 1110.

The first actuator body part 1110 and the second actuator body part 1120 can comprise materials with different coefficients of thermal expansion. For example, the first actuator body part 1110 can be constructed from steel and the second actuator body part 1120 can be constructed from aluminum. The effective coefficient of thermal expansion ($CTE_A$) of the actuator 1100 is related to $CTE_1$ and the $CTE_2$, and can be approximated by:

$$L_A \times CTE_A \cong (L_1 \times CTE_1) + (L_2 \times CTE_2)$$

where $L_1$ is the distance from the threads of the ring 1170 to the first end 1104, $L_2$ is the distance from the threads of the ring 1170 to the second end 1108, and $L_A$ is the length of the actuator ($L_A = L_1 + L_2$). Typically, the coefficient of the ring 1170 ($CTE_3$) has less of an impact on $CTE_A$ than does $CTE_1$ and $CTE_2$.

In one example, during manufacturing, the ring 1170 is threaded into the first actuator body part 1110 and the threaded portion 1140 of the second actuator body part is threaded into the ring 1170. $CTE_A$ can be adjusted (e.g., without affecting the length, $L_A$, of the actuator) by rotating the ring 1170 relative to the first actuator body part 1110 and relative to the threaded portion 1140 while the threaded portion 1140 does not rotate relative to the first actuator body part 1110. Rotating the ring 1170 thus will move the threads of the ring 1170 either closer to the first end 1104 of the actuator 1110 or closer to the second end 1108 of the actuator 1100. As the threads of the ring 1170 approach the first end 1104, $CTE_A$ becomes closer in value to $CTE_2$ (e.g., coefficient of thermal expansion of the second actuator body part 1120). Conversely, as the threads of the ring 1170 approach the second end 1108, $CTE_A$ becomes closer in value to $CTE_1$.

The length of the actuator, $L_A$, can be changed by rotating the threaded portion 1140 and the first actuator body part 1110 relative to the ring 1170 in any manner that is not equivalent to the rotation described above for adjusting the $CTE_A$. For example, $L_A$ can be adjusted by holding the ring 1170 and the first actuator body party 1110 together without relative rotation, while rotating the threaded portion 1140 in the ring 1170. By rotating the threaded portion 1140 and the first actuator body part 1110 relative to the ring 1170 at an appropriate ratio, $L_A$ can be adjusted without significantly affecting the $CTE_A$ of the actuator. Based on the approximation regarding $CTE_A$, described previously, if the rotation angle of the threaded portion 140, $a_1$, and the rotation angle of the first actuator body part, $a_2$, are related by:

$$a_1/a_2 \cong CTE_2/CTE_1$$

$L_A$ can be changed without significantly affecting $CTE_A$.

In one embodiment, the first actuator body part 1110 can be adapted to receive a first contact piece 1150. Additionally, the second actuator body part 1120 can similarly be adapted to receive a second contact piece 1160. The first contact piece 1150 and/or the second contact piece 1160 can be detachable from the remainder of the actuator 1100 (e.g., not permanently coupled to the first actuator body part 1110 and/or the second actuator body part 1120).

Figure 12:
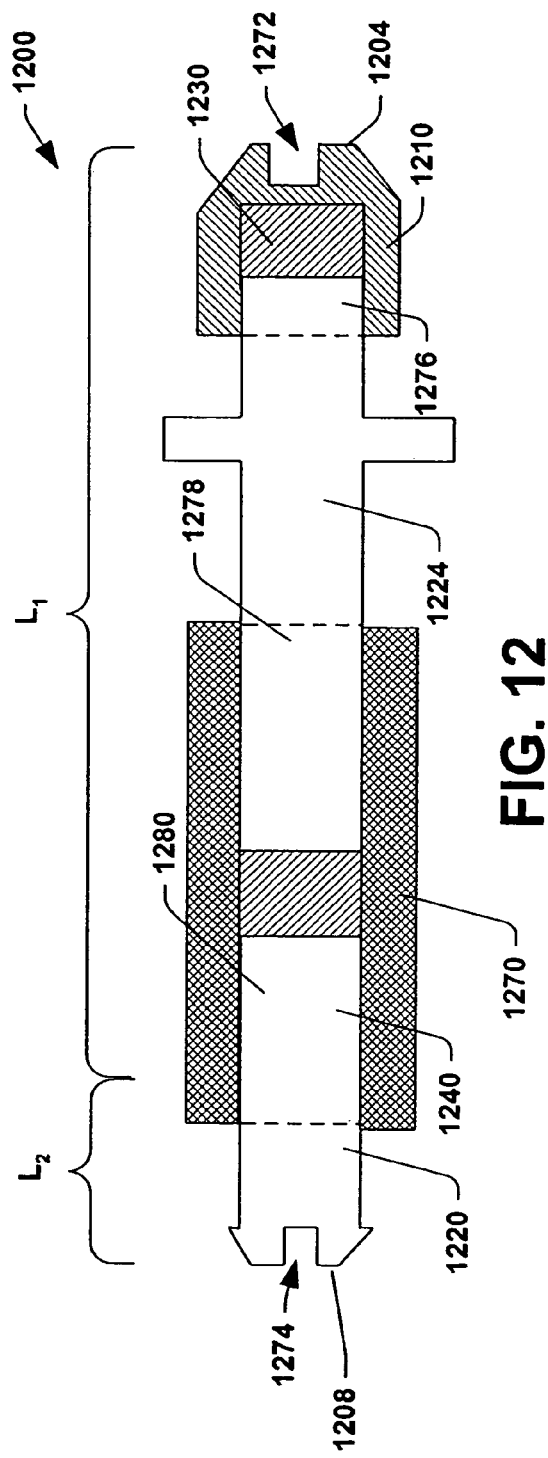
FIG. 12 is a cross section view of an actuator in accordance with an aspect of the present invention.

Turning to FIG. 12, an actuator 1200 in accordance with an aspect of the present invention is illustrated. The actuator 1200 is one embodiment of a compressive-state actuator having both its length, $L_A$, and its coefficient of thermal expansion (CTE) independently adjustable. The actuator 1200 has a first end 1204 and a second end 1208.

In this embodiment, the actuator 1200 includes a first actuator body part 1210, a second actuator body part 1220 and a third actuator body part 1224. The first actuator body part 1210 includes a boring 1230 through at least part of the first actuator body part 1210. The first actuator body part 1210 has a first coefficient of thermal expansion ($CTE_1$).

The second actuator body part 1220 includes a threaded portion 1240. The second actuator body part 1220 has a second coefficient of thermal expansion ($CTE_2$).

The actuator 1200 further comprises a nut 1270 that has a third coefficient of thermal expansion ($CTE_3$). The nut 1270 can comprise any suitable material, for example copper.

The third actuator body part 1224 includes a threaded portion 1278. the third actuator body part 1224 has a fourth coefficient of thermal expansion $CTE_4$.

In one example, the first actuator body part 1210, the third actuator body part 1224 and the nut 1270 are made of a first material (e.g., magnesium) and the second actuator body part 1220 is made with a second material (e.g., Invar—a commercial grade of steel) that has a CTE that is different from the first material.

In another example, the first end 1204 and/or the second end 1208 include slots 1272, 1274, for example, to straddle an OIC. By straddling the chip, the slots can facilitate maintaining the actuator 1200 in its intended position (e.g., between a first contact location and a second contact). Additionally, contact pieces (not shown) can be recessed into the slots 1272, 1274 respectively.

After the actuator 1200 is installed so that the slots 1272, 1274 straddle the OIC, neither the second actuator body part 1220 nor the first actuator body part 1210 are free to rotate relative to the OIC. Consequently, the second actuator body part 1220 cannot be rotated relative to the first actuator body part 1210 after the actuator is installed. The third actuator body part 1224 can have a differential thread. For example, the third actuator body part 1230 can be threaded with a 72 threads per inch (t.p.i.) right handed thread at a first end 1276 and threaded with an 80 t.p.i. right handed thread at a second end 1278. The second actuator body part 1220 can be threaded (e.g., an 80 t.p.i. right-handed thread) at one end 1280.

The length of the actuator 1200 can be adjusted by holding the first actuator body part 1210, nut 1270 and second actuator body part 1220 such that they do not rotate relative to each other and rotating the third actuator body part 1230 relative to the first actuator body part 1210. Because the threads at the first end 1276 are coarser than the threads at the second end 1278, the third actuator body part 1230 is translated relative to the first actuator body part 1210 faster than it is translated relative to the second actuator body part 1220. The length adjustment provided by the rotation of the third body part 1230 is a fine adjustment (e.g., the rate of adjustment can be approximately 0.0014 inches per full turn of the nut). When the length is adjusted in this manner, $CTE_A$ of the actuator is not affected.

The $CTE_A$ of the actuator 1200 can be adjusted by holding the first actuator body part 1210, third actuator body part 1230 and second actuator body part 1220 such that they do not rotate relative to each other and rotating the nut 1270 relative to the third actuator body part 1230. $CTE_A$ is related to $CTE_1$, $CTE_2$, $CTE_3$ and $CTE_4$; however, in the instance where the first actuator body part 1210, the third actuator body part 1224 and the nut 1270 are made of the same or similar material, $CTE_A$ can be approximated as follows:

$$L \times CTE_A \cong (L_1 \times CTE_1) + (L_2 \times CTE_2)$$

where $L_1$ is the distance from the gripping-point of the threads of the second actuator body part 1220 to the first end 1204, $L_2$ is the distance from the gripping-point of the threads of the second actuator body part 1220 to the second end 1208, and L is the length of the actuator (e.g., L=L1+L2). "Gripping-point" refers to a distance of about three threads from the end of the threads closest to the first end 1204.

Figure 13:
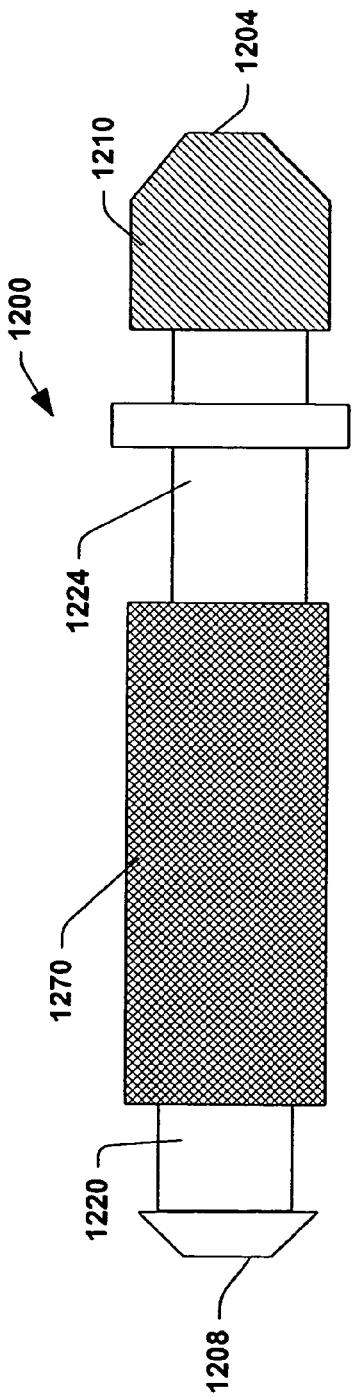
FIG. 13 is a schematic top plan view of the actuator of FIG. 12.
Figure 14:
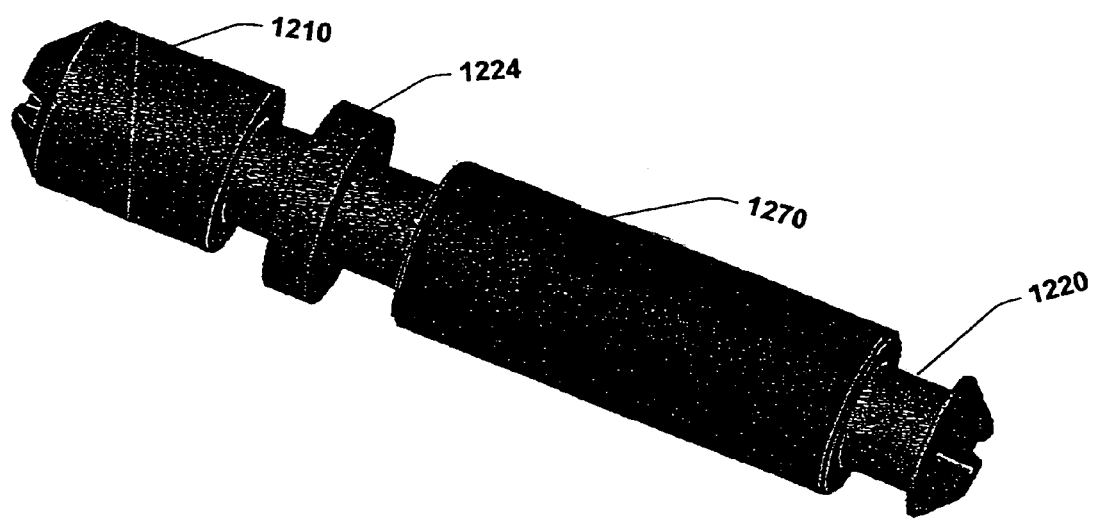
FIG. 14 is a perspective view of the actuator of FIGS. 12 and 13.

FIG. 13 illustrates a schematic top plan view of the actuator 1200 and FIG. 14 illustrates a perspective view of the actuator 1300.

As illustrated in FIG. 15, an actuator 1500 can comprise a first actuator body part 1210, a third actuator body part 1224, a nut 1270, an end shaft 1284 and an end-ring 1282.

In one example, the first actuator body part 1210, the third actuator body part 1224 and the nut 1270 are made of a first material (e.g., magnesium or aluminum) and the end-shaft 1284 is made with a second material (e.g., Invar or steel)) that has a CTE that is different from the first material.

The nut 1270, third actuator body part 1224 and first actuator body part 1210 can be configured similar to those of the actuator 1200. The end shaft 1284 is not threaded and is held in position by the end ring 1282, which is threaded into the nut 1270. Rotating the third actuator body part 1224 adjusts the length of the actuator, L, as described for the actuator 1200. In addition, rotating the end-ring 1282 adjusts the length of the actuator 1500.

The end-ring 1282 and the end-shaft 1284 can be configured so that the end-ring 1282 can be rotated without rotating the end-shaft 1284, thus this length adjustment can be made while a slot in the end-shaft 1284 straddles the OIC. For example, the rate of length adjustment provided by this rotation can be approximately 0.0125 inches per full turn of the end-ring 1282. This is a coarser length adjustment than is provided by the nut 1270 and is suitable for accommodating length adjustments that are larger than can be provided by the rotation of the nut 1270.

Figure 17:
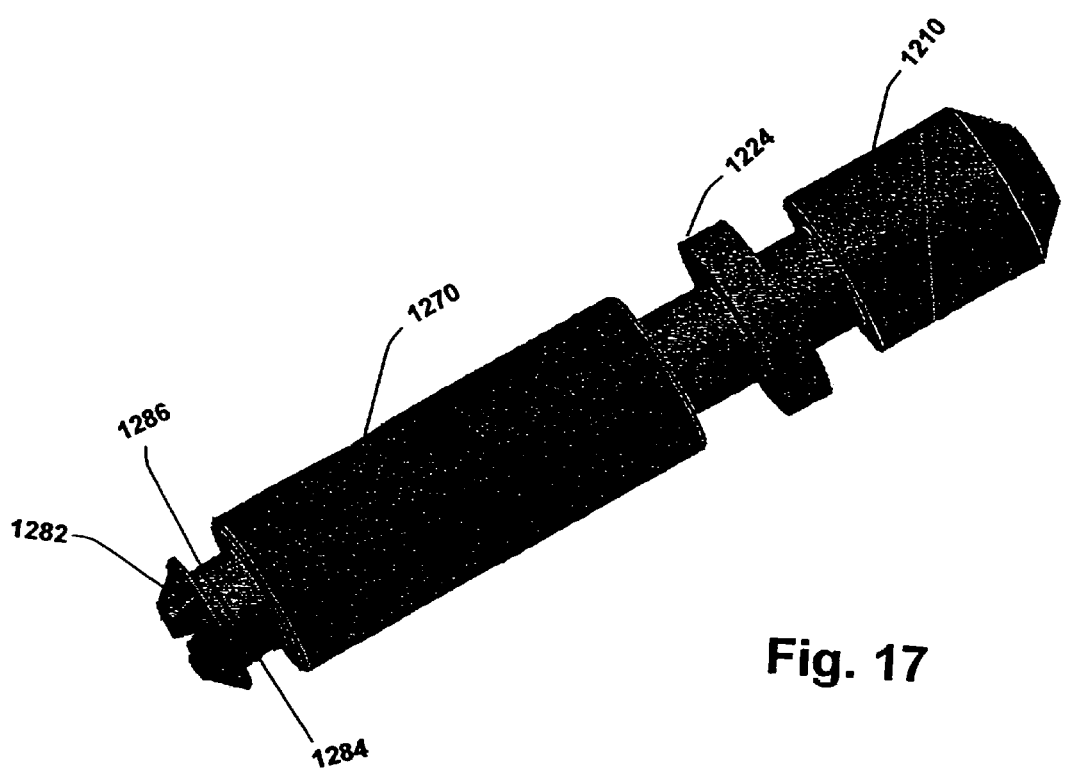
FIG. 17 is a perspective view of the actuator of FIGS. 15 and 16.

FIG. 16 illustrates a schematic top plan view of the actuator 1500 and FIG. 17 illustrates a perspective view of the actuator 1500. Referring briefly to FIG. 17, in one example, at least one first recessed blind hole 1286 can be formed on the end-ring 1282. A tool that is designed to hold the end-ring 1282 at the recessed hole(s) 1286 can be used to rotate the end-ring 1282 relative to the end-shaft 1284.

Figure 18:
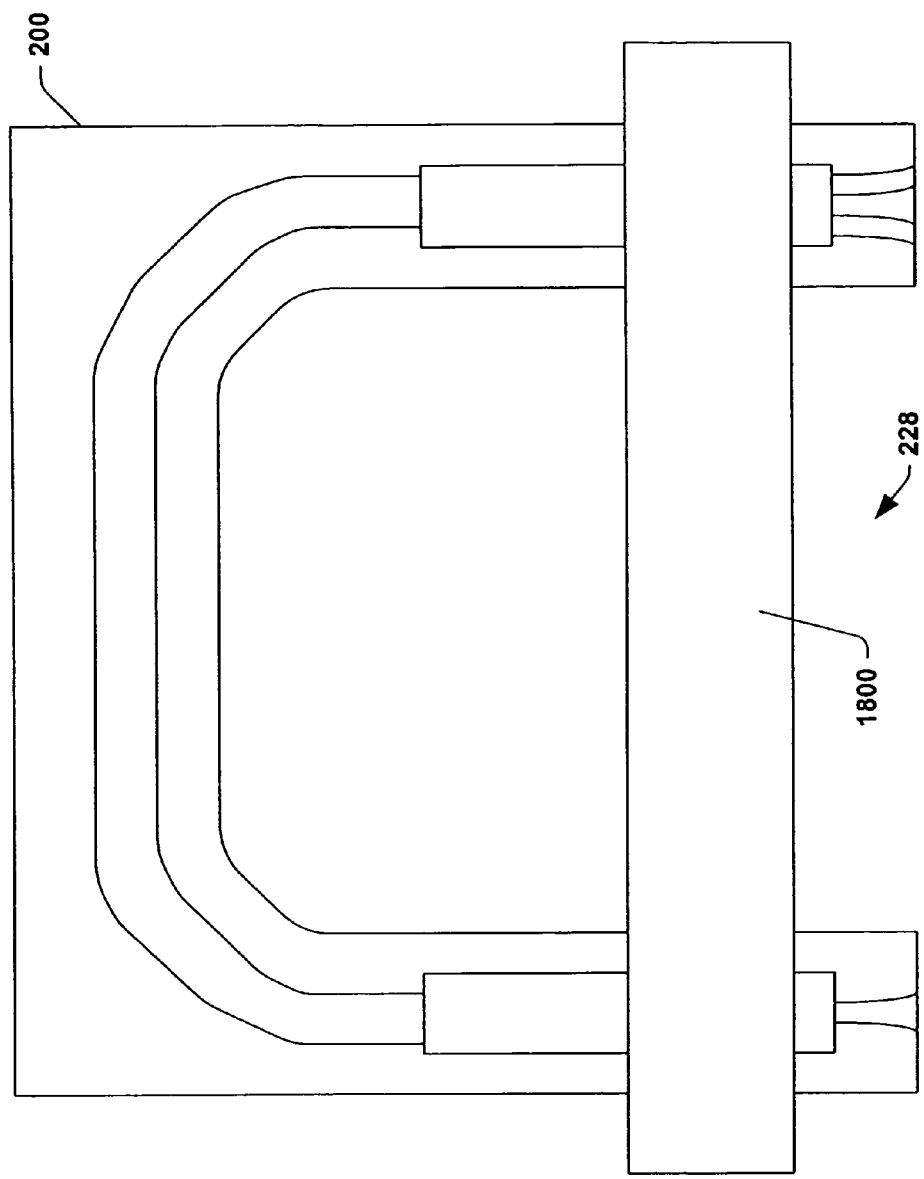
FIG. 18 is a schematic top plan view of an OIC employing an actuator in accordance with an aspect of the present invention.
Figure 19:
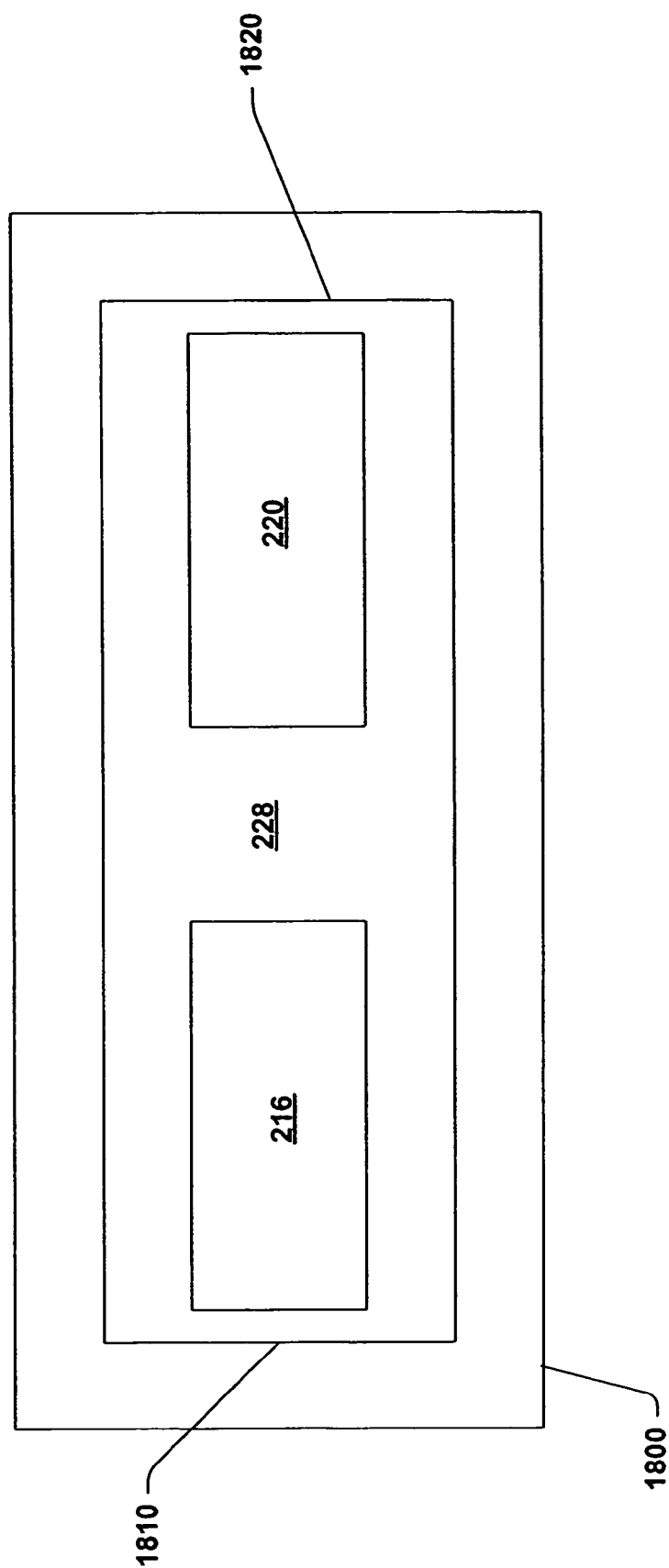
FIG. 19 is a top cross section view of the OIC employing the actuator of FIG. 18.

Referring next to FIGS. 18 and 19, an actuator 1800 in accordance with an aspect of the present invention is illustrated. The actuator 1800 is one embodiment of a tensile-state actuator.

Figure 20:
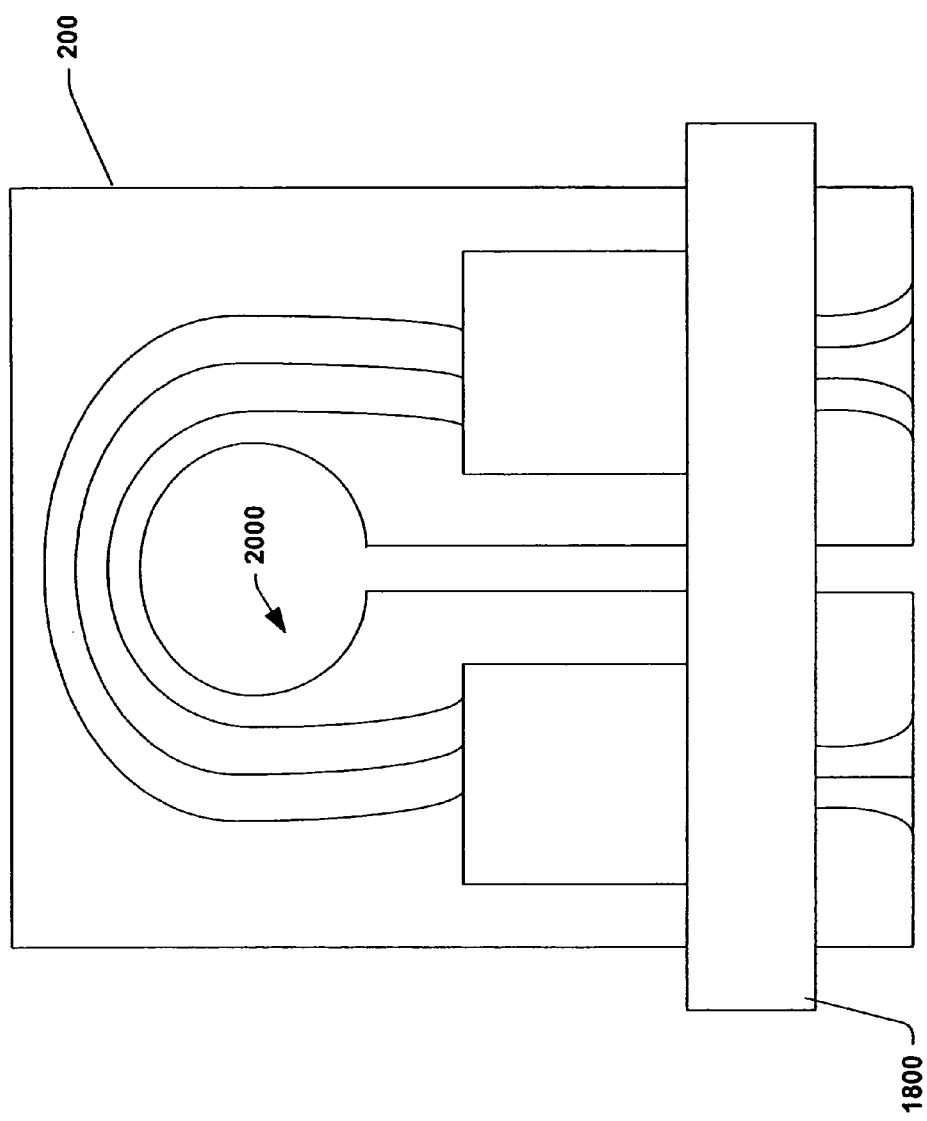
FIG. 20 is a schematic top plan view of an OIC employing an actuator in accordance with an aspect of the present invention.

In one example, the actuator 1800 contacts the OIC 200 at a first contact location 1810 and a second contact location 1820, both of which are outside of the gap 228. The length of the actuator 1800 is the distance between the first contact location 1810 and the second contact location 1820. The actuator 1800 typically remains in a state of tension over the entire operating temperature range of the OIC (e.g., applies a force that tends to pull the first region 216 towards the second region 220 over the entire operating temperature range). As with the compressive-state actuators, the length of the actuator 1800 increases as the temperature increases and the increased length can be configured to cancel the effect of the change in refractive index of the materials used for the OIC 200 that result from a change in temperature. Since the actuator 1800 does not require substantial rigidity, the actuator 1800 can have a smaller mass relative to compressive-state actuators. The actuator 1800, for example, can comprise a flexible metal band or a loop of wire. FIG. 20 depicts the actuator 1800 with an OIC 200 having a keyhole-cut shaped cut-out 2000.

Figure 21:
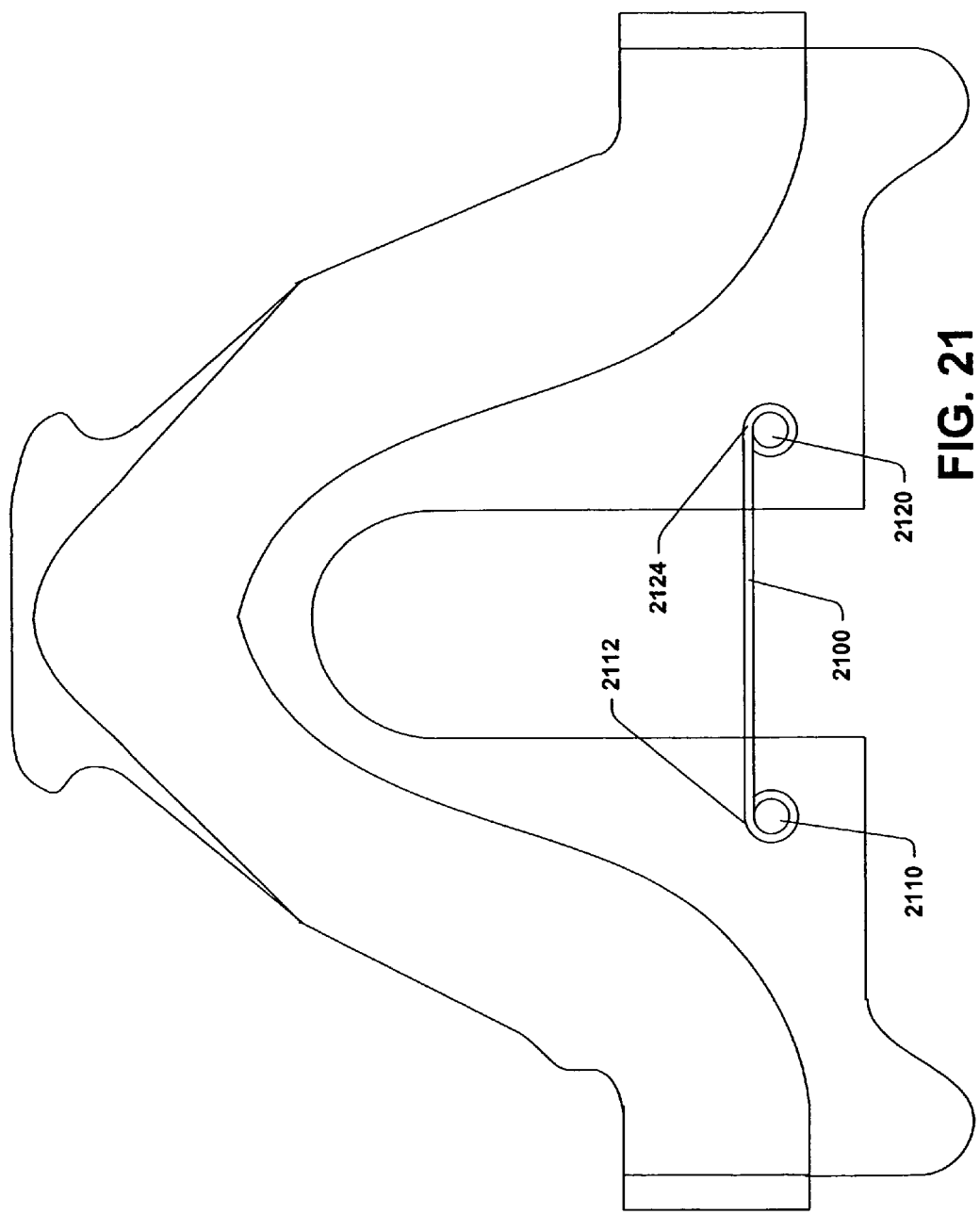
FIG. 21 is a schematic top plan view of an OIC employing an actuator in accordance with an aspect of the present invention.
Figure 22:
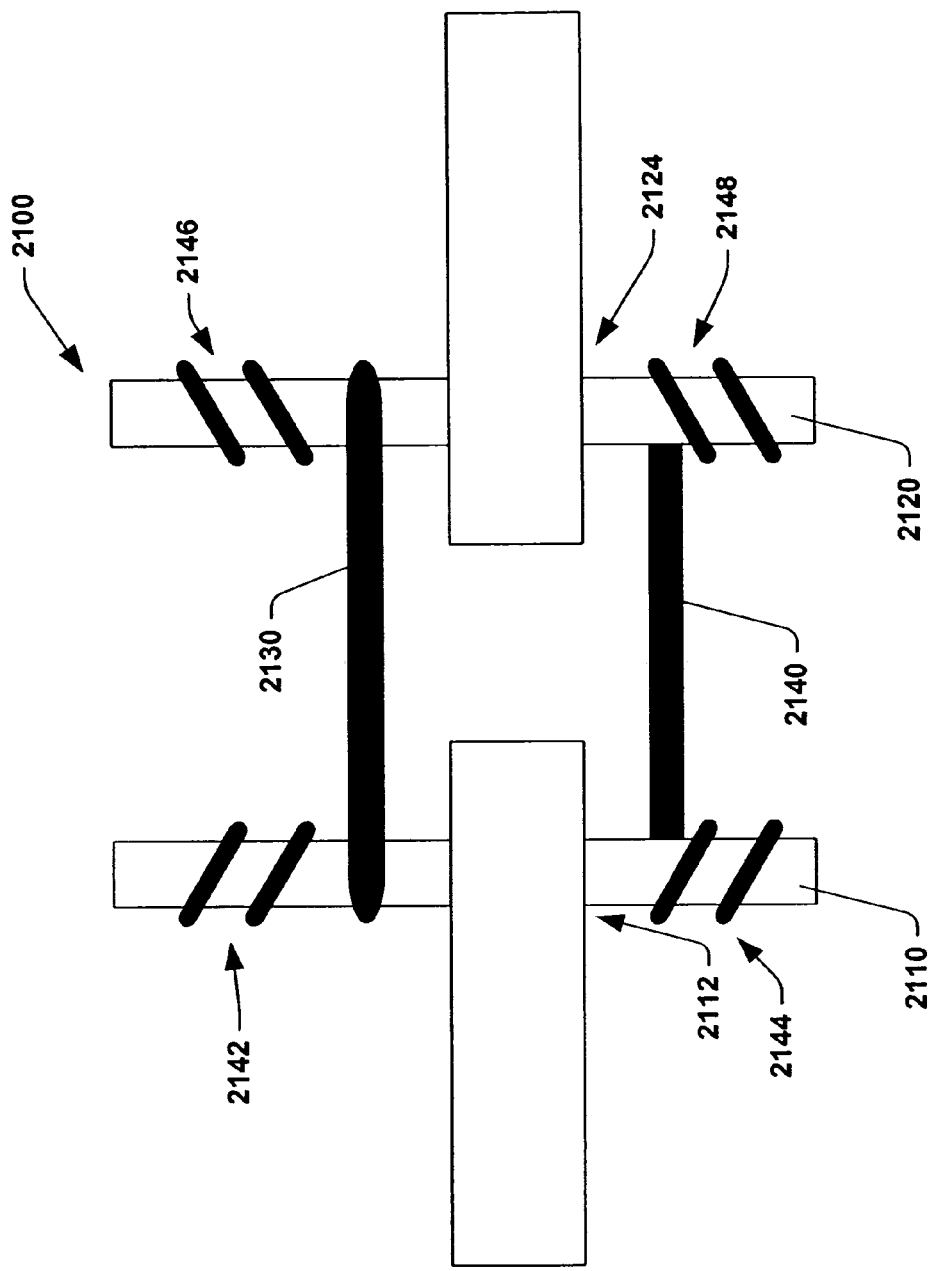
FIG. 22 is a cross section view of the OIC employing the actuator of FIG. 21.

Turning to FIGS. 21 and 22, an actuator 2100 in accordance with an aspect of the present invention is illustrated. The actuator 2100 is one embodiment of a tensile-state actuator.

In this example, a first post 2110 extends through a hole 2112 (e.g., in the first region 216) and a second post 2120 extends through a hole 2124 (e.g., in the second region 220). The actuator 2100 comprises a first wire 2130 and a second wire 2140. The wires 2130, 2140 are attached to the posts 2110, 2120 with winding attachments 2142, 2144, 2146 and 2148, which can include soldering and/or crimping as part of securing the attachment.

Windings 2142 and 2144 can be configured with opposing helicity so that no net torque is applied to the first post 2112. Windings 2146 and 2148 can be configured with opposing helicity so that no net torque is applied to the second post 2120.

Figure 23:
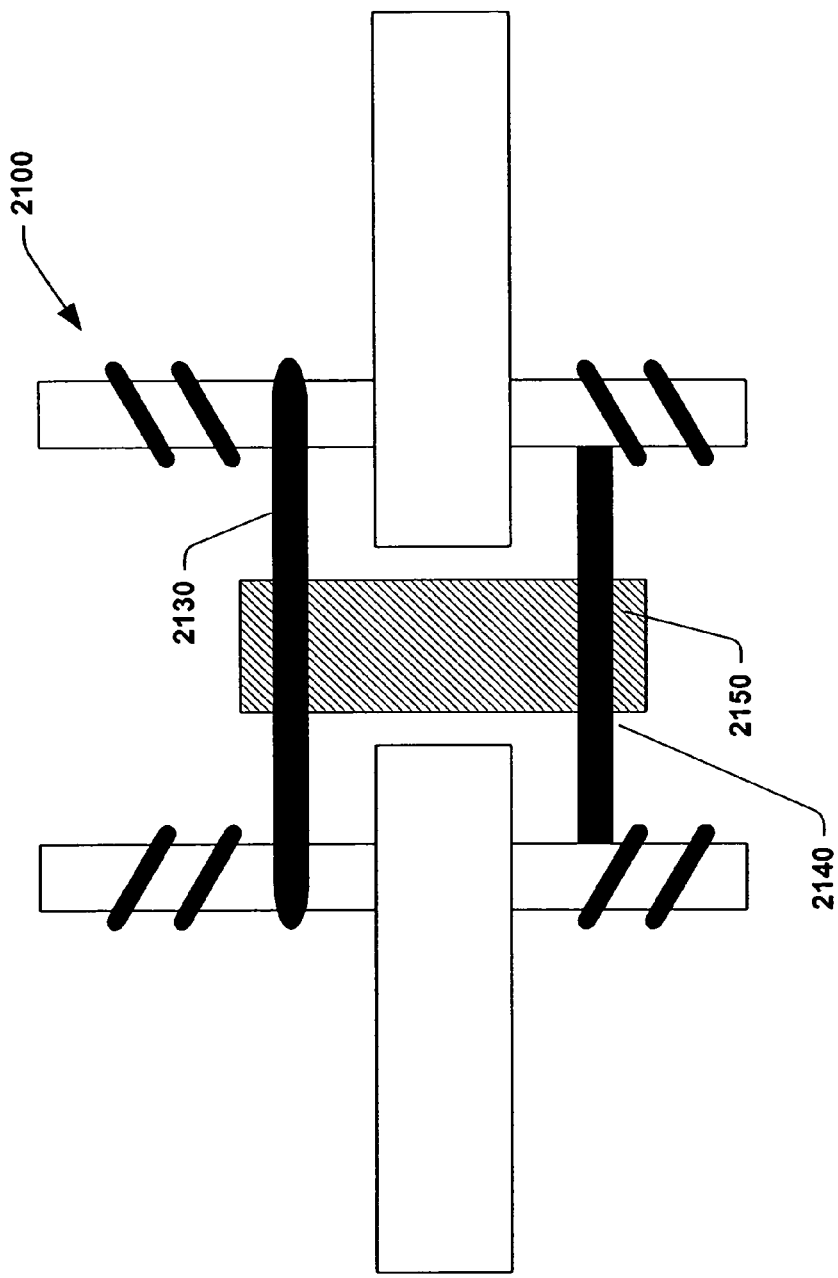
FIG. 23 is a cross section view of an OIC employing an actuator in accordance with an aspect of the present invention.

Referring to FIG. 23, the actuator 2100 can, optionally, include a clamp 2150. The clamp 2150 can be configured so as to provide a method of adjusting the length of the actuator 2100. For example, crimping the clamp 2150, may draw the middle of the first wire 2130 closer to the middle of the second wire 2140, thus increasing the tension in the wires 2130, 2140 and thereby shortening the distance between the first post 2110 and the second post 2120, (e.g., shortening the actuator 2100).

The actuator 2100 can be realized with elements with low mass because they do not require a rigid structure, which is required to maintain a compressive state. An actuator with reduced mass can be preferred because components with larger mass have a higher risk of damaging the device (OIC) when the device is subjected to shock or vibration. Another advantage of a tensile-state actuator is that there is reduced risk of the forces becoming misaligned and causing out-of-plane deformations of either the first region 216 or the second region 220 (e.g., it reduces the risk of buckling of the chip).

Figure 24:
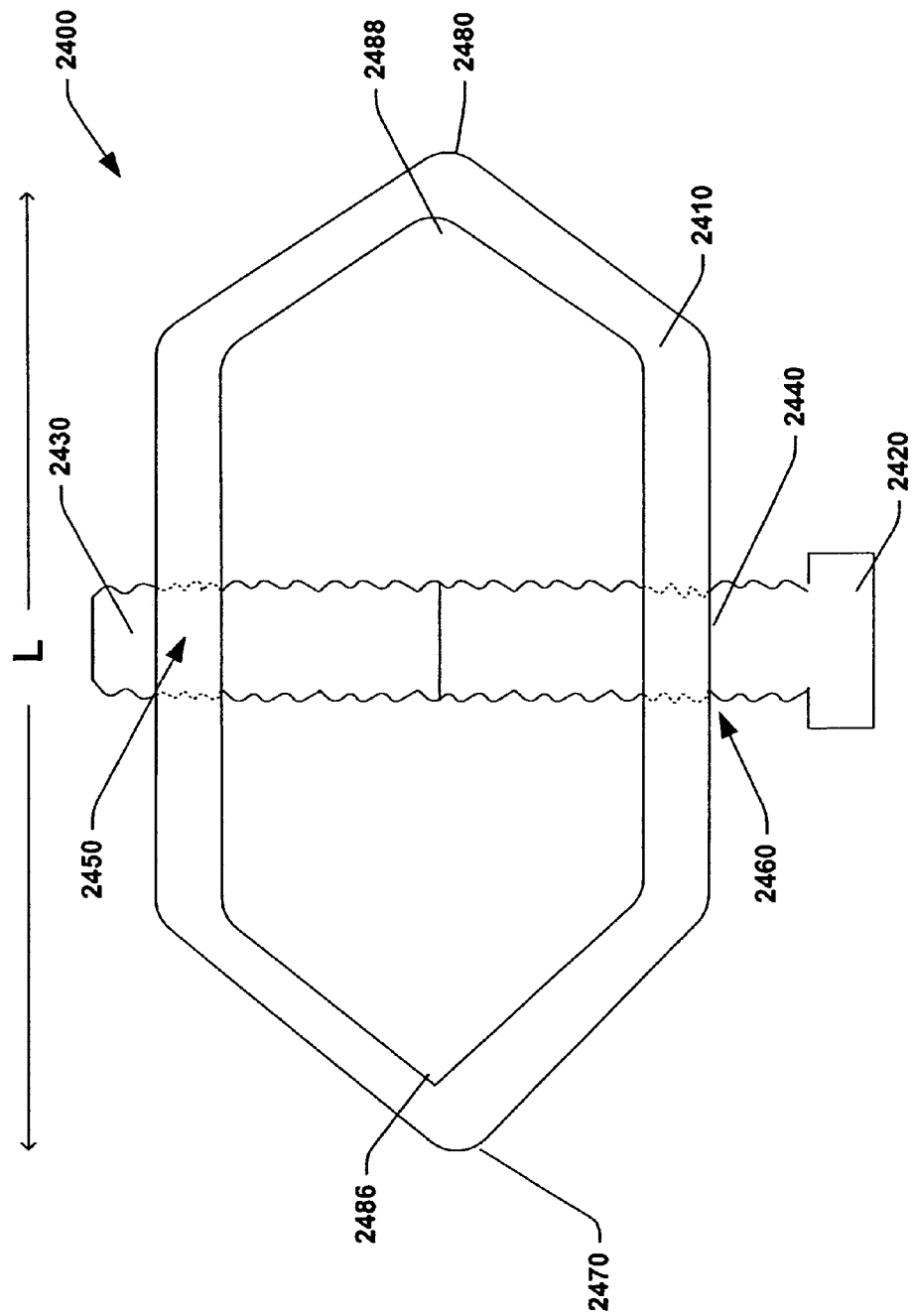
FIG. 24 is a schematic view of an actuator in accordance with an aspect of the present invention.

Turning to FIG. 24, an actuator 2400 in accordance with an aspect of the present invention is illustrated. The actuator 2400 includes a first actuator body 2410 and a second actuator body 2420.

The second actuator body part 2420 can comprise a first threaded portion 2430 (e.g., right-handed thread) and a second threaded portion 2440 (left-handed thread).

The first actuator body part comprises threaded bore sections 2450, 2460 to receive the first threaded portion 2430 and the second threaded portion 2440, respectively.

The length of the actuator 2400 is the distance between the first end 2470 and the second end 2480. Rotating the second actuator body part 2420 will translate the threaded bore section 2450 relative to the threaded bore section 2460 and consequently deform the actuator 2400 such that is length changes. The actuator 2400 can be employed as a compressive-state actuator with contact surfaces at locations 2470 and 2480. Alternatively, the actuator 2400 can be employed as a tensile-state actuator with contact surfaces at locations 2486 and 2488.

Figure 25:
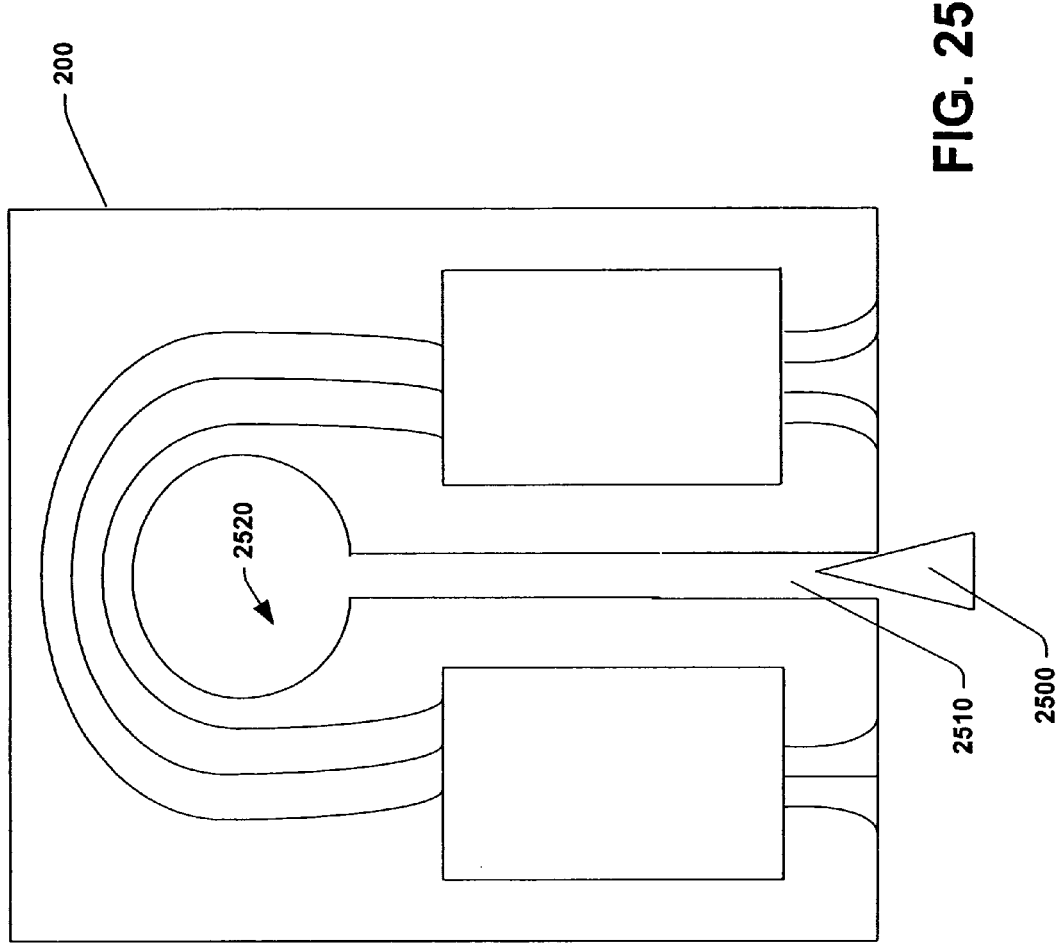
FIG. 25 is a schematic top view of an OIC employing a wedge in accordance with an aspect of the present invention.

Referring to FIG. 25, an OIC 200 employing a wedge 2500 in accordance with an aspect of the present invention is illustrated. The wedge 2500 is inserted into a slot 2510 in the OIC 200. For example, the slot 2510 can be part of a key-hole cut-out 2520.

In one example, a force is applied to and/or removed from the wedge 2500 via a force actuator (not shown). In another example, the wedge 2500 has a coefficient of thermal expansion. Thermal expansion and/or thermal contraction of the wedge 2500 can result in expansion and/or contraction force(s) applied to the slot 2510.

Another aspect of the invention provides methodologies for manufacturing an optical integrated circuit, wherein a base is provided having at least one waveguide in a first region and at least one waveguide in a second region. A connecting region the first region and the second region is further provided. A first lens is provided in the connecting and the first region is scroll-diced from the second region. Alternatively, the first region can be separated from the second region (e.g., beyond the lens—excluding the lens) by patterned etching of the base. An actuator is provided between the first region and the second region.

It is to be appreciated by those skilled in the art, that while the present invention has been described with respect to scroll dicing in order to effect separation between regions, that any suitable means for separating regions may be employed within the scope of the present invention, including, but not limited to, laser dicing and patterned etching.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "with", "has", "having", and variants thereof are used in either the detailed description or the claims, these terms are intended to be inclusive in a manner similar to the term "comprising."

What is claimed is:

1. A method of making an optical integrated circuit, comprising:
   providing a base having at least one waveguide in a first region and at least one waveguide in a second region;
   providing a connecting region between the first region and the second region;
   providing a first lens in the connecting region;
   scroll dicing the first region from the second region; and
   providing an actuator between the first region and the second region, wherein the actuator comprises a first actuator body part having a first coefficient of thermal expansion and a second actuator body part having a second coefficient of thermal expansion, wherein the first actuator body part is adjustably coupled to the second actuator body part, the second actuator body part coupled to the first actuator body part, at least a portion of the first actuator body part threadably coupled to at least a portion of the second actuator body part.

2. The method of claim 1, wherein the first actuator body part comprises a boring to receive a threaded insert and the second actuator body part comprises a thread.

3. The method of claim 1, wherein the base comprises an arrayed waveguide grating.

4. The method of claim 1, wherein in response to a temperature change, a length of the actuator changes from about 0.01 micron to about 10 microns per ° C.

5. The method of claim 1, wherein in response to a temperature change within the range of about −20° C., to about +95° C., the actuator causes the first region to move from about 0.5 micron to about 100 microns with respect to the second region.

6. The method of claim 1, wherein in response to a temperature change within the range of about −20° C. to about +95° C., the actuator causes the first region to move from about 5 microns to about 50 microns with respect to the second region.

7. The method of claim 1, the first coefficient of thermal expansion is greater than the second coefficient of thermal expansion.

8. The method of claim 1, the first coefficient of thermal expansion is less than the second coefficient of thermal expansion.

9. The method of claim 1, the actuator is one of a tensile-state actuator and a compressive state actuator.

10. The method of claim 1, wherein at least one of the first region and the second region comprises at least one selected from the group of doped silica, lithium niobate, undoped silica, glass, thermo optic polymers, electro optic polymers and indium phosphide.

11. The method of claim 1, wherein the actuator further comprises a third actuator body part.

12. The method of claim 1, wherein at least one of the first actuator body part and the second actuator body part comprises at least one selected from the group of aluminum, brass, bronze, chromium, copper, gold, iron, magnesium, nickel, palladium, platinum, silver, stainless steel, tin, titanium, tungsten, zinc, zirconium, alumina, aluminum silicate, silicone rubber, a polyamide composite, fiberglass reinforced nylon, elastomer, polycarbonate, polyolefin, polyester, silicone rubber, PEEK, carbon fiber, graphite, glass fiber and liquid crystal polymer.

13. The method of claim 1, wherein scroll dicing the first region from the second region is carried out by using at least one of a water-jet, laser-wafer-cutter, wire-saw, laser dicing, and patterned etching.

14. A method of making an optical integrated circuit, comprising:
   providing a base having at least one waveguide in a first region and at least one waveguide in a second region, the base comprising a connecting region between the first region and the second region and a first lens in the connecting region;
   separating the first region from the second region; and
   providing an adjustable length actuator between the first region and the second region, the adjustable length actuator comprising a first actuator body part having a first coefficient of thermal expansion and a second actuator body part having a second coefficient of thermal expansion, wherein the first actuator body part is adjustably coupled to the second actuator body part, at least one of the first actuator body part and the second actuator body part comprising at least one selected from the group of aluminum, brass, copper, nickel, stainless steel, and titanium, wherein the second actuator body part is coupled to the first actuator body part and at least a portion of the first actuator body part is threadably coupled to at least a portion of the second actuator body part.

15. The method of claim 14, wherein the base comprises an arrayed waveguide grating.

16. The method of claim 14, wherein the first coefficient of thermal expansion is greater than the second coefficient of thermal expansion.

17. The method of claim 14, wherein the first coefficient of thermal expansion is less than the second coefficient of thermal expansion.

18. The method of claim 14, wherein the wherein in response to a temperature change, a length of the adjustable length actuator changes from about 0.01 micron to about 10 microns per ° C.

19. The method of claim 14, wherein separating the first region from the second region is carried out by using at least one of a water-jet, laser-wafer-cutter, wire-saw, laser dicing, and patterned etching.

20. A method of making an optical integrated circuit, comprising:
   providing a base having at least one waveguide in a first region and at least one waveguide in a second region, the base comprising a connecting region between the first region and the second region and a first lens in the connecting region;
   separating the first region from the second region; and providing an adjustable length actuator between the first region and the second region, the adjustable length actuator contacting the first region and the second region, the adjustable length actuator comprising a first actuator body part having a first coefficient of thermal expansion and a second actuator body part having a second coefficient of thermal expansion, wherein the first actuator body part is adjustably coupled to the second actuator body part, at least one of the first actuator body part and the second actuator body part comprising at least one selected from the group of aluminum, brass, copper, nickel, stainless steel, and titanium, wherein the second actuator body part is coupled to the first actuator body part and at least a portion of the first actuator body part is threadably coupled to at least a portion of the second actuator body part and the first actuator body part comprises a boring to receive a threaded insert and the second actuator body part comprises a thread.

21. The method of claim 20, wherein the base comprises an arrayed waveguide grating.

22. A method of making an optical integrated circuit, comprising:
providing a base having at least one waveguide in a first region and at least one waveguide in a second region;
providing a connecting region between the first region and the second region;
providing a first lens in the connecting region;
scroll dicing the first region from the second region; and
providing an actuator between the first region and the second region, wherein the actuator comprises a first actuator body part having a first coefficient of thermal expansion and a second actuator body part having a second coefficient of thermal expansion, wherein the first actuator body part is adjustably coupled to the second actuator body part, and in response to a temperature change, a length of the actuator changes from about 0.01 micron to about 10 microns per ° C.

23. A method of making an optical integrated circuit, comprising:
providing a base having at least one waveguide in a first region and at least one waveguide in a second region;
providing a connecting region between the first region and the second region;
providing a first lens in the connecting region;
scroll dicing the first region from the second region; and
providing an actuator between the first region and the second region, wherein the actuator comprises a first actuator body part having a first coefficient of thermal expansion and a second actuator body part having a second coefficient of thermal expansion, wherein the first actuator body part is adjustably coupled to the second actuator body part, and in response to a temperature change within the range of about −20° C. to about +95° C., the actuator causes the first region to move from about 0.5 micron to about 100 microns with respect to the second region.

* * * * *